(12) United States Patent
He et al.

(10) Patent No.: US 12,300,832 B2
(45) Date of Patent: May 13, 2025

(54) POWER BATTERY PACK AND ELECTRIC VEHICLE

(71) Applicant: BYD COMPANY LIMITED, Guangdong (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/594,050

(22) Filed: Mar. 4, 2024

(65) Prior Publication Data

US 2024/0204318 A1    Jun. 20, 2024

Related U.S. Application Data

(63) Continuation of application No. 17/421,875, filed as application No. PCT/CN2019/092390 on Jun. 21, 2019, now Pat. No. 11,955,651.

(30) Foreign Application Priority Data

Jan. 9, 2019  (CN) .......................... 201910020925.5
Jan. 9, 2019  (CN) .......................... 201910020967.9

(Continued)

(51) Int. Cl.
*B60K 1/04*    (2019.01)
*B60L 50/60*   (2019.01)
(Continued)

(52) U.S. Cl.
CPC ............. *H01M 50/209* (2021.01); *B60K 1/04* (2013.01); *B60L 50/64* (2019.02); *B60L 50/66* (2019.02);
(Continued)

(58) Field of Classification Search
CPC ............. H01M 50/209; H01M 50/249; H01M 50/119; H01M 50/317; H01M 2220/20;
(Continued)

(56) References Cited

U.S. PATENT DOCUMENTS 11,088,412 B2 *  8/2021  Matecki .............. H01M 50/204

FOREIGN PATENT DOCUMENTS

EP    2693515 A1     2/2014
KR    1020130116342 A   10/2013

* cited by examiner

*Primary Examiner* — Jason D Shanske
*Assistant Examiner* — James J Triggs
(74) *Attorney, Agent, or Firm* — Calfee, Halter & Griswold LLP

(57) ABSTRACT

A cell for use in a power battery pack. The cell incudes a battery body having a length L, a width H, a thickness D, and a volume V. The length L is greater than the width H. The width H is greater than the thickness D. The battery body meets: 400 mm≤L≤2500 mm and 0.0005 mm$^{-2}$≤L/V≤0.002 mm$^{-2}$.

20 Claims, 14 Drawing Sheets

| | | | |
|---|---|---|---|
| (30) | Foreign Application Priority Data | | |

Jan. 9, 2019 (CN) .......................... 201910021244.0
Jan. 9, 2019 (CN) .......................... 201910021246.X
Jan. 9, 2019 (CN) .......................... 201910021247.4
Jan. 9, 2019 (CN) .......................... 201910021248.9

(51) Int. Cl.

| | |
|---|---|
| *B60L 50/64* | (2019.01) |
| *H01M 10/052* | (2010.01) |
| *H01M 10/42* | (2006.01) |
| *H01M 10/613* | (2014.01) |
| *H01M 10/625* | (2014.01) |
| *H01M 10/647* | (2014.01) |
| *H01M 10/6551* | (2014.01) |
| *H01M 10/6554* | (2014.01) |
| *H01M 50/103* | (2021.01) |
| *H01M 50/119* | (2021.01) |
| *H01M 50/209* | (2021.01) |
| *H01M 50/244* | (2021.01) |
| *H01M 50/249* | (2021.01) |
| *H01M 50/271* | (2021.01) |
| *H01M 50/317* | (2021.01) |
| *H01M 50/342* | (2021.01) |
| *H01M 50/35* | (2021.01) |
| *H01M 50/383* | (2021.01) |
| *H01M 50/531* | (2021.01) |
| *H01M 50/543* | (2021.01) |
| *B60L 58/26* | (2019.01) |

(52) U.S. Cl.
 CPC ....... *H01M 10/052* (2013.01); *H01M 10/425* (2013.01); *H01M 10/613* (2015.04); *H01M 10/625* (2015.04); *H01M 10/647* (2015.04); *H01M 10/6551* (2015.04); *H01M 10/6554* (2015.04); *H01M 50/103* (2021.01); *H01M 50/119* (2021.01); *H01M 50/244* (2021.01); *H01M 50/249* (2021.01); *H01M 50/271* (2021.01); *H01M 50/317* (2021.01); *H01M 50/342* (2021.01); *H01M 50/3425* (2021.01); *H01M 50/35* (2021.01); *H01M 50/383* (2021.01); *H01M 50/531* (2021.01); *H01M 50/543* (2021.01); *B60K 2001/0405* (2013.01); *B60K 2001/0438* (2013.01); *B60L 58/26* (2019.02); *H01M 2010/4271* (2013.01); *H01M 2220/20* (2013.01)

(58) Field of Classification Search
 CPC .... H01M 50/131; H01M 50/103; B60K 1/04; B60K 2001/0438; B60L 50/64; B60L 50/66
 See application file for complete search history.

POWER BATTERY PACK AND ELECTRIC VEHICLE

CROSS-REFERENCE TO RELATED APPLICATIONS

This application is a Continuation of U.S. application Ser. No. 17/421,875 filed on Jul. 9, 2021, which is a National Stage of PCT Application No. PCT/CN2019/092390, filed on Jun. 21, 2019, which claims priority to Chinese Patent Application Serial Nos. "201910021244.0", "201910020967.9", "201910021246.X", "201910021248.9", "201910021247.4", and "201910020925.5", filed by BYD Company Limited on Jan. 9, 2019 and entitled "BATTERY PACK, VEHICLE, AND ENERGY STORAGE DEVICE", the entire disclosures of each of which are incorporated by reference in this application in their entireties.

FIELD

This application relates to the field of battery technologies, and specifically, to a power battery pack and an electric vehicle having the power battery pack.

BACKGROUND

In the related art, for example, a power battery pack applied to an electric vehicle, mainly includes a pack body and a plurality of battery modules mounted in the pack body. Each battery module is assembled by a plurality of cells.

As users have increasingly high requirements for endurance capacity of the electric vehicle, a power battery pack by using the prior art has a low space utilization of an internal space in a case of a limited bottom space of the vehicle. In addition, energy density of the power battery pack cannot meet the demand, gradually becoming an important factor restricting the development of the electric vehicle.

SUMMARY

In the foregoing prior art, as shown in FIG. 1, a pack body 200" of a power battery pack 10' is mostly divided into mounting areas of a plurality of battery modules 400' by a cross beam 500 and a longitudinal beam 600', the battery module 400' being fixed to the cross beam 500' or the longitudinal beam 600' by using screws or in another manner. The battery module 400' includes a plurality of cells arranged in sequence, the plurality of cells being arranged to form a battery array, and an end plate and/or side plate being disposed outside the battery array. Generally, the end plate and the side plate are included simultaneously and are fixed to enclose a space for accommodating the battery array. In addition, the end plate and the side plate are connected by using screws, or connected by using another connecting member such as a pull rod, to fix the battery array.

It is found through experiments and analysis that the battery module 400' is fixed to the cross beam 500' or the longitudinal beam 600' by using screws or other structures, which wastes space, and increases weight because of addition of screws or other connecting members. In addition, the battery module 400' is designed through fitting of the end plate and the side plate. Both the end plate and the side plate have certain thicknesses and heights, wasting a space inside the pack body 200" and reducing a volume utilization of the pack body 200". Generally, for the power battery pack 10' in the foregoing prior art, a ratio of a sum of volumes of cells in the pack body 200" to a volume of the pack body 200" is about 50% or even lower to 40%.

In a case of a limited bottom space of the vehicle body, by using the power battery pack 10' provided in the embodiments in the foregoing prior art, the end plate and the side plate of the battery module 400' and a connection method and a mounting method inside the power battery pack 10', and the like reduce a utilization of an internal space of the pack body 200". Accordingly, in the power battery pack 10', a ratio of the sum of volumes of the cells to the volume of the pack body 200" is excessively low, and energy density of the power battery pack is reduced.

This application is intended to resolve at least one of the technical problems existing in the prior art. Therefore, an objective of this application is to provide a power battery pack. The power battery pack has advantages of a high space utilization, large energy density, a strong endurance capacity, and the like.

This application further provides an electric vehicle having the power battery pack.

An embodiment of a first aspect of this application provides a power battery pack, configured to provide power for an electric vehicle, and including: a pack body; a plurality of cells, disposed in the pack body, the cell having a length $L0$, a width $H0$, and a thickness $D0$, where $L0 > H0 \geq D0$;

when the power battery pack is placed on the electric vehicle, a length direction of the cell extends along a width direction or a length direction of the electric vehicle;

when the length direction of the cell extends along the width direction of the electric vehicle, the length $L0$ of the cell and a size $W$ of a vehicle body of the electric vehicle in the width direction meet: $46\% \leq L0/W \leq 76\%$; or when the length direction of the cell extends along the length direction of the electric vehicle, the length $L0$ of the cell and a size $X$ of the vehicle body of the electric vehicle in the length direction meet: $40\% \leq L0/X \leq 76\%$.

According to the power battery in the embodiments of this application, a proportion of the length of the cell to the size of the vehicle body in the width direction and a proportion of the length of the cell to the size of the vehicle body in the length direction are limited, so that more cells of the power battery pack may be arranged in a unit space of the vehicle body, that is, more energy providing structures are arranged in a unit space, to make full use of the space of the vehicle body. Therefore, the energy density may be improved, thereby improving the endurance capacity without expanding an occupation space.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description of the embodiments made with reference to the following accompanying drawings.

REFERENCE NUMERALS

Figure 1:
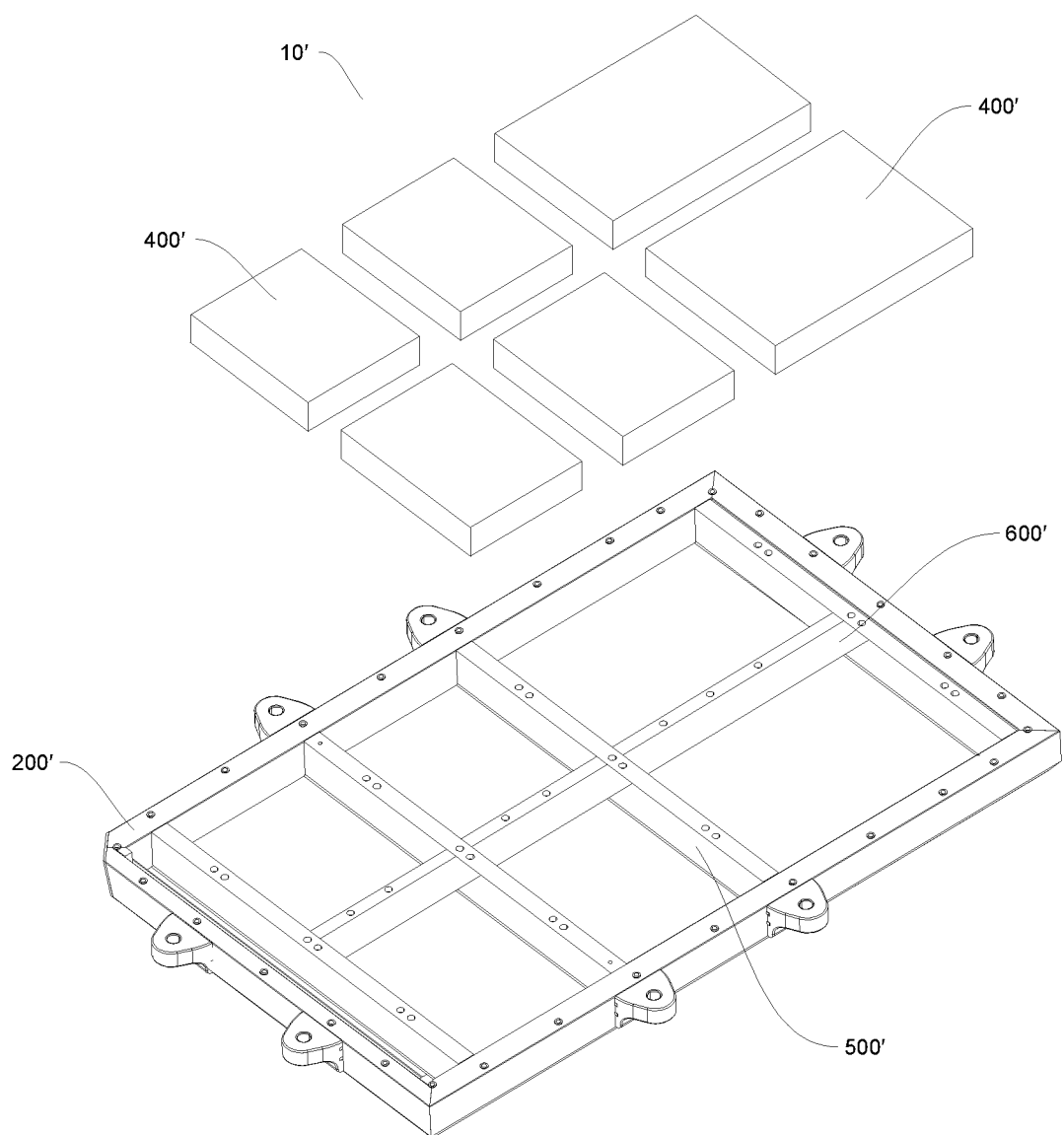
FIG. 1 is an exploded view of a power battery pack provided in the prior art.

In the prior art:
Power battery pack 10', pack body 200", battery module 400', longitudinal beam 600', and cross beam 500';
In this application:
Electric vehicle 1,
power battery pack 10,
cell 100, battery body 110, pack body 200, tray 210, upper cover 220, first side beam 201, second side beam 202, first end beam 203, second end beam 204, exhaust channel 222, air inlet 221,
battery module 400,
first tab 101, second tab 102, explosion-proof valve 103,
longitudinal beam 600, cross beam 500,
length direction A of power battery pack 10, width direction B of power battery pack 10, height direction C of battery power pack 10,
length L0 of cell 100, width H0 of cell, thickness D0 of cell, length L of battery body 110, width H of battery body 110, thickness D of battery body 110, width W of vehicle body, and width F of pack body 200

DETAILED DESCRIPTION

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "vertical", "transverse", "length", "width", "thickness", "inside", and "outside" are based on orientation or position relationships shown in the accompanying drawings, and are used only for ease and brevity of illustration and description, rather than indicating or implying that the mentioned apparatus or element needs to have a particular orientation or needs to be constructed and operated in a particular orientation. Therefore, such terms should not be construed as limiting of the present application.

In addition, in the description of this application, "a plurality of" means two or more than two.

Considering a current situation of the power battery pack in the related art, this application provides a power battery pack and an electric vehicle having the power battery pack. The power battery pack has advantages of a high space utilization, large energy density, a strong endurance capacity, and the like.

The power battery pack 10 according to an embodiment of this application is described below with reference to the accompanying drawings.

As shown in FIG. 2 to FIG. 16, the power battery pack 10 according to an embodiment of this application includes a pack body 200 and a plurality of cells 100. The power battery pack 10 is configured to provide power for an electric vehicle 1. The electric vehicle herein includes, but is not limited to, an electric automobile, an electric train, an electric bicycle, and a club car. According to specific embodiments of this application, the power battery 10 is configured to be fixed to the electric vehicle.

The plurality of cells 100 are disposed in the pack body 200. The pack body 200 may be understood as a housing configured to accommodating the plurality of cells 100, for example, may include a tray 210 and an upper cover 220. The tray 210 and the upper cover 220 jointly limit an accommodating space for the plurality of cells 100. The plurality of cells 100 are disposed on the tray 210, and are covered by using the upper cover 220, that is, disposed in the accommodating space formed by the tray 210 and the upper cover 220. A length $L_0$ of the cell and a size W of a vehicle body of the electric vehicle in a width direction meet: $46\% \leq L/W \leq 76\%$; or the length $L_0$ of the cell and a size X of the vehicle body of the electric vehicle in a length direction meet: $40\% \leq L_0/X \leq 76\%$.

In some specific embodiments, when a length direction of the cell 100 extends along the width direction of the vehicle body of the electric vehicle, the length $L_0$ of the cell and a size W of the vehicle body of the electric vehicle in the width direction meet: $46\% \leq L_0/W \leq 76\%$. In some other specific embodiments, when the length direction of the cell 100 extends along the length direction of the vehicle body of the electric vehicle, the length $L_0$ of the cell and a size X of the vehicle body of the electric vehicle in the length direction meet: $40\% \leq L_0/X \leq 76\%$.

A person skilled in the art may understand that the width direction of the vehicle body refers to a left-right direction of the vehicle, and the size W of the vehicle body in the width direction refers to a width of the vehicle body; and the length direction of the vehicle body refers to a traveling direction of the vehicle, and the size X of the vehicle body in the length direction refers to a length of the vehicle body.

According to the power battery pack 10 in the embodiments of this application, a proportion of the length of the cell 100 to the size W of the vehicle body in the width direction is limited, that is, 46%≤$L_0$/W≤76%, or a proportion of the length of the cell 100 to the size X of the vehicle body in the length direction is limited, that is, 40%≤$L_0$/X≤76%, so that the power battery pack 10 may be provided with more cells 100 in a unit space of the vehicle body, that is, may be provided with more energy providing structures in a unit space, to make full use of the space of the vehicle body. Therefore, the energy density may be improved, thereby improving the endurance capacity without expanding an occupation space.

In some embodiments of this application, to improve the energy density and the endurance capacity, a sum V1 of volumes of the plurality of cells 100 and a volume V2 of the power battery pack 10 meet: V1/V2≥55%. In some embodiments of this application, a sum V1 of volumes of the plurality of cells 100 and a volume V2 of the power battery pack 10 meet: V1/V2≥60%. In some embodiments of this application, a sum V1 of volumes of the plurality of cells 100 and a volume V2 of the power battery pack 10 meet: V1/V2≥62%. In some embodiments of this application, a sum V1 of volumes of the plurality of cells 100 and a volume V2 of the power battery pack 10 meet: V1/V2≥65%. It may be understood that V2 is an overall volume of a three-dimensional shape limited by an outer contour of the power battery pack 10, that is, a volume including an internal space of the power battery pack 10, that is, a volume of a three-dimensional region enclosed by the outer contour of the power battery pack 10 in space. In the electric vehicle, V1/V2 may be understood as a space utilization.

A person skilled in the art may understand that due to the influence of some factors, for example, peripheral parts and components, including a ball-strike preventing space at the bottom of the tray, a liquid cooling system, a thermal insulation material, an insulation protector, a thermal security accessory, a fire and gas exhaust channel, and a high-voltage power distribution module, occupy the internal space of the pack body 200, a peak value of V1/V2 is usually 80%, that is, V1/V2≤80%.

The power battery pack 10 according to the embodiments of this application is described below with reference to the accompanying drawings. A length direction of the power battery pack 10 is indicated by using an arrow A, a width direction of the power battery pack 10 is indicated by using an arrow B, and a height direction of the power battery pack 10 is indicated by using an arrow C.

Figure 2:
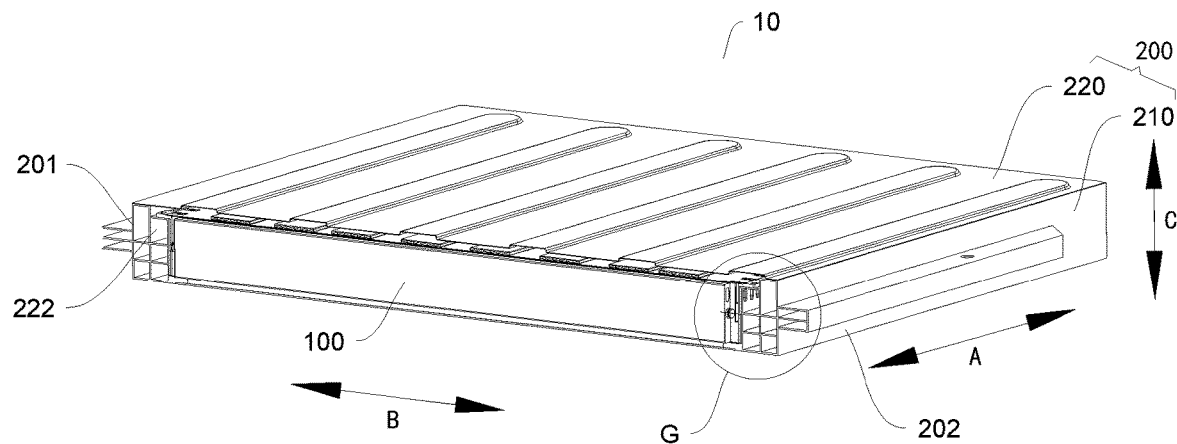
FIG. 2 is a cross-sectional view of a power battery pack according to an embodiment of this application.
Figure 3:
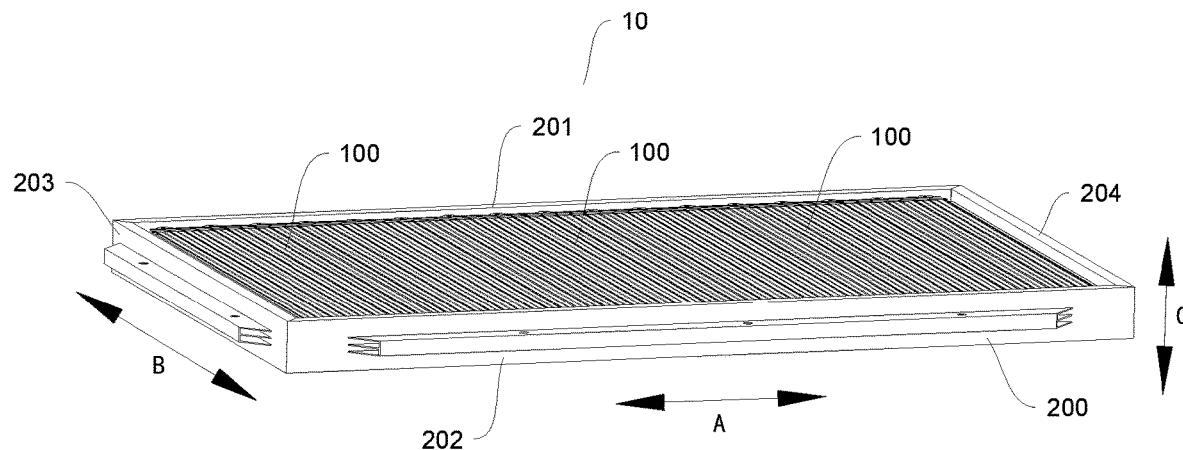
FIG. 3 is a three-dimensional diagram of a power battery pack according to an embodiment of this application.
Figure 4:
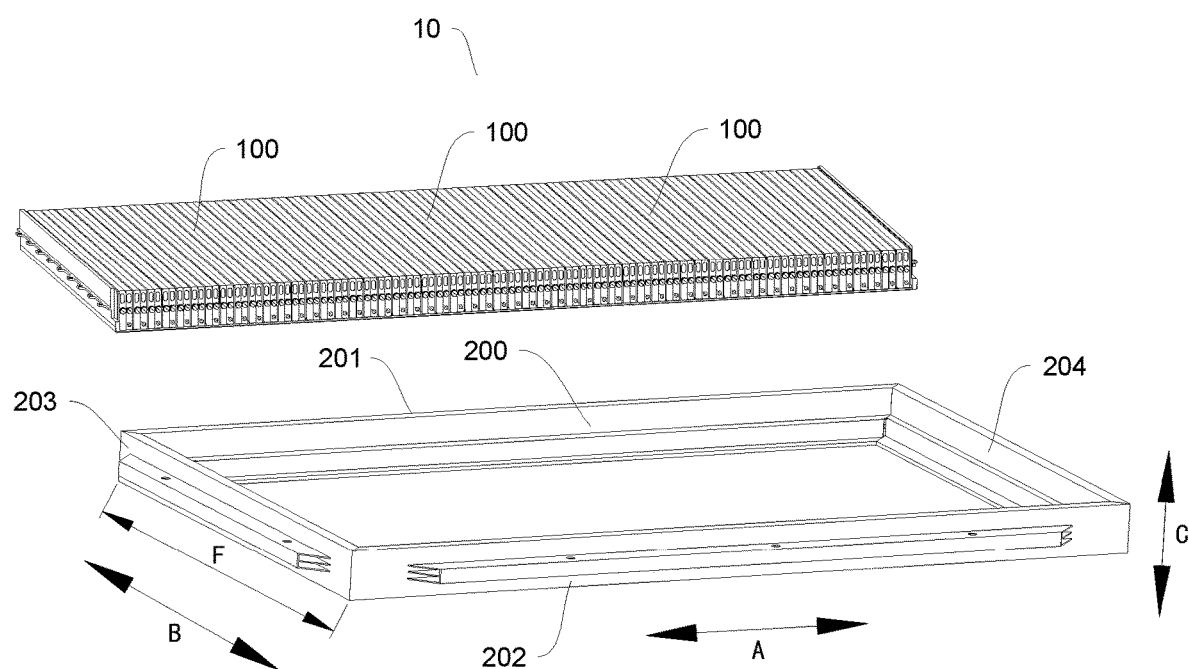
FIG. 4 is an exploded view of a power battery pack according to an embodiment of this application.

In some specific embodiments of this application, as shown in FIG. 2 to FIG. 4, the length direction of the cell 100 is arranged along the width direction B of the power battery pack 10, and the plurality of cells 100 are arranged along the length direction A of the power battery pack 10, facilitating in setting the space utilization of the power battery pack 10 to 55%, 60%, 62%, 65%, or a greater value.

In some specific examples of this application, as shown in FIG. 3 and FIG. 4, in the width direction B of the power battery pack 10, a distance between the cell 100 and a side wall of the pack body 200 is less than the length of the cell 100. Specifically, in the width direction B of the power battery pack 10, a shortest distance between an end of the cell 100 and a side beam of the pack body 200 close to the end of the cell 100 is L1, a shortest distance between an other end of the cell 100 and a side beam of the pack body 200 close to the other end of the cell 100 is L2, and the length $L_0$ of the cell 100 meets: L1+L2<$L_0$. In this way, another additional cell 100 cannot be accommodated in the width direction B of the power battery pack 10.

In other words, only one cell 100 is accommodated in the pack body 200 in the width direction B of the power battery pack 10. That is, in the width direction B of the power battery pack 10, two or more cells 100 cannot be arranged in the direction.

It may be understood that two sides of the pack body 200 are side beams in the width direction B of the power battery pack 10, and two ends of the pack body 200 are end beams in the length direction A of the power battery pack 10.

In some specific examples of this application, as shown in FIG. 3 and FIG. 4, the length of the cell 100 extends in the entire width direction B of the power battery pack 10. That is, the cell 100 extends from one side to an other side of the pack body 200 along the width direction B of the power battery pack 10, and the length of the cell 100 is filled in the width direction B of the power battery pack 10. Two or more cells 100 cannot be placed in the pack body 200 in the width direction B of the power battery pack 10, and two ends of the cell 100 in the length direction may fit two opposite side walls of the pack body 200 in the width direction B, for example, are fixed to the pack body 200. Therefore, no cross beam and longitudinal beam is needed inside the pack body 200, and connected cells 100 are directly used as a reinforcing rib, to greatly simplify the structure of the pack body 200, and reduce a space occupied by the reinforcing rib and a space occupied by a mounting structure of the cell 100, thereby improving a space utilization and endurance capacity.

Figure 13:
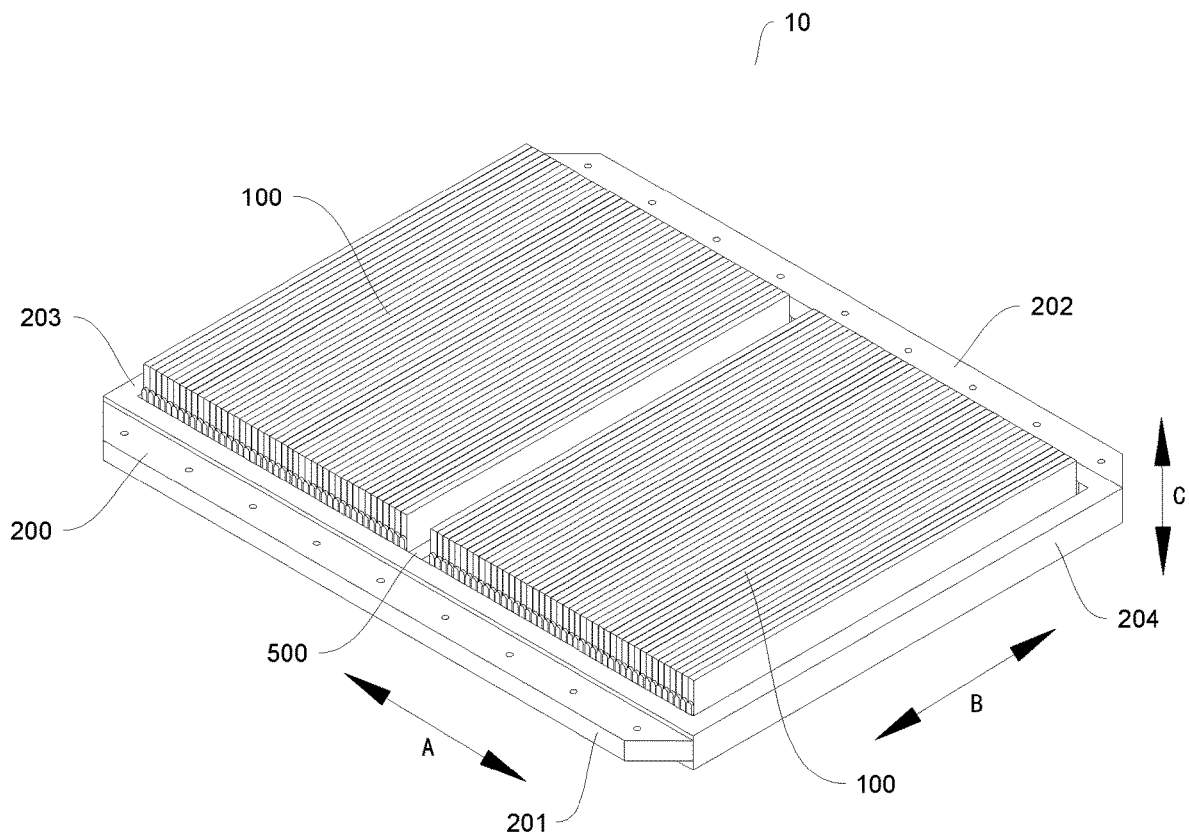
FIG. 13 is a three-dimensional diagram of a power battery pack according to a second optional embodiment of this application.

Certainly, the embodiments of this application are not limited to the absence of a cross beam and a longitudinal beam. In some embodiments of this application, as shown in FIG. 13, a cross beam 500 may be disposed in the pack body 200, and the cross beam 500 extends along the width direction B of the power battery pack 10. The plurality of cells 100 are arranged along the length direction A of the power battery pack 10 to form a battery array, and the cross beam 500 divides the battery array into at least two parts along the length direction A of the power battery pack 10, each part of the battery array including at least one cell 100, and each part of the battery array forming a battery module 400.

Figure 12:
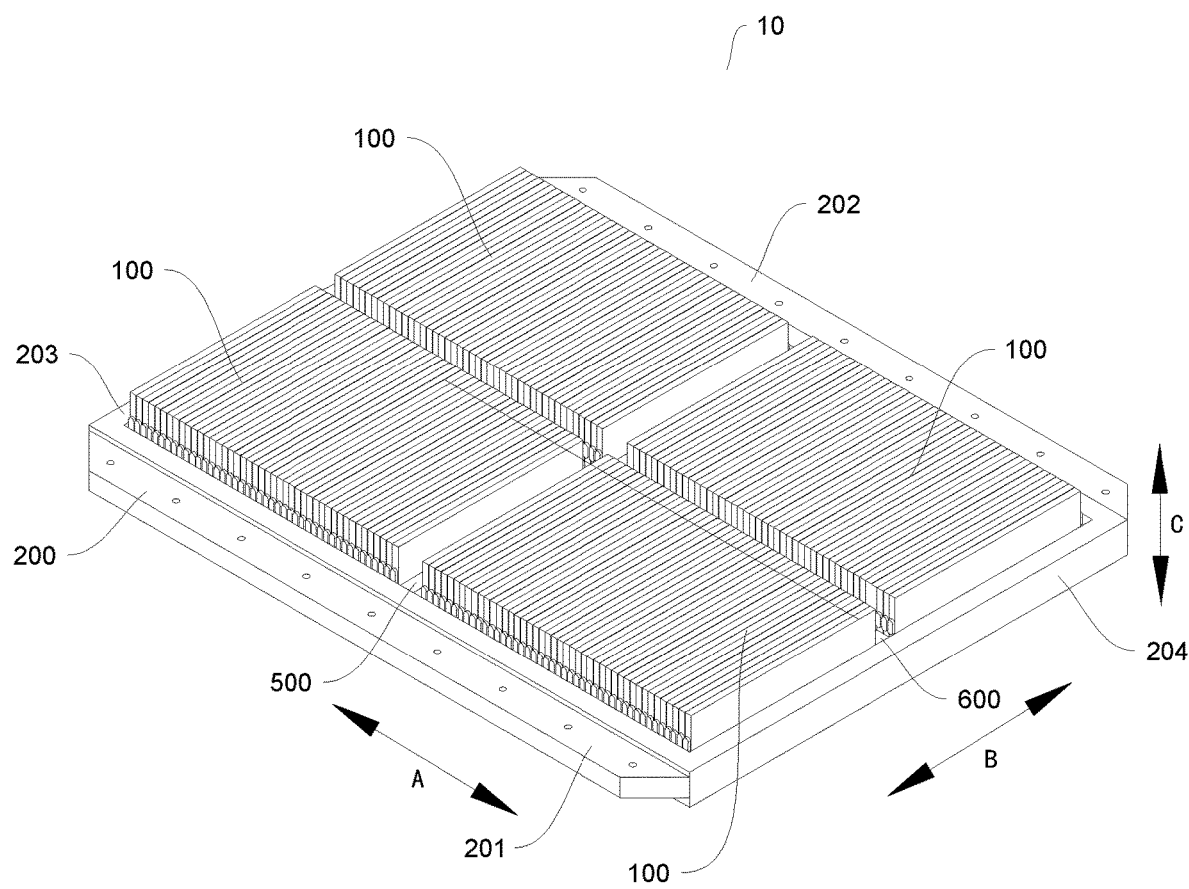
FIG. 12 is a three-dimensional diagram of a power battery pack according to a first optional embodiment of this application.

Certainly, in some other embodiments of this application, as shown in FIG. 12, a longitudinal beam 600 may be further disposed in the pack body 200, and the longitudinal beam 600 extends along the length direction A of the power battery pack 10. The length direction of the cell 100 is arranged along the width direction B of the power battery pack 10, and the plurality of cells 100 are arranged along the length direction A of the power battery pack 10 to form a battery array. At least two rows of battery arrays are arranged in the pack body 200 along the width direction B of the power battery pack 10, each row of battery array including a plurality of cells 100 arranged along the length direction A of the power battery pack 10, and the longitudinal beam 600 being located between the two neighboring rows of battery arrays.

In some specific examples of this application, the pack body 200 includes side beams located at two sides of the power battery pack 10 in the width direction B, and two ends of the cell 100 in the length direction are supported by the side beams; and the pack body 200 includes end beams located at two ends of the power battery pack 10 in the length direction A, the end beam providing an inward pressing force for cells 100 close to the end beam.

As shown in FIG. 3 and FIG. 4, the pack body 200 includes a first side beam 201, a second side beam 202, a first end beam 203, and a second end beam 204. The first side beam 201, the first end beam 203, the second side beam 202, and the second end beam 204 are connected end to end sequentially. The first side beam 201 is opposite to the second side beam 202 in the width direction B of the power battery pack 10, and the first end beam 203 is opposite to the second end beam 204 in the length direction A of the power battery pack 10. The first side beam 201 and the second side beam 202 provide supporting forces for the two ends of the cell 100 in the length direction, that is, an end of the cell 100 is supported by the first side beam 201, and an other end of cell is supported by the second side beam 202. The first end beam 203 and the second end beam 204 provide pressing forces for two sides of cells 100 in a thickness direction. That is, the first end beam 203 applies a force, facing the second end beam 204, to cells 100 disposed close to the first end beam 203, and the second end beam 204 applies a force, facing the first end beam 203, to cells 100 disposed close to the second end beam 204, so that a plurality of cells 100 can be closely arranged between the first end beam 203 and the second end beam 204 along the length direction A of the power battery pack 10, and the plurality of cells 100 can fit each other. In addition, the first end beam 203 and the second end beam 204 may limit the plurality of cells 100 in the length direction A of the power battery pack 10. In particular, when the cells 100 slightly swell, the cells 100 can be buffered and provided with an inward pressure to prevent the cells 100 from swelling and deforming excessively.

Figure 7:
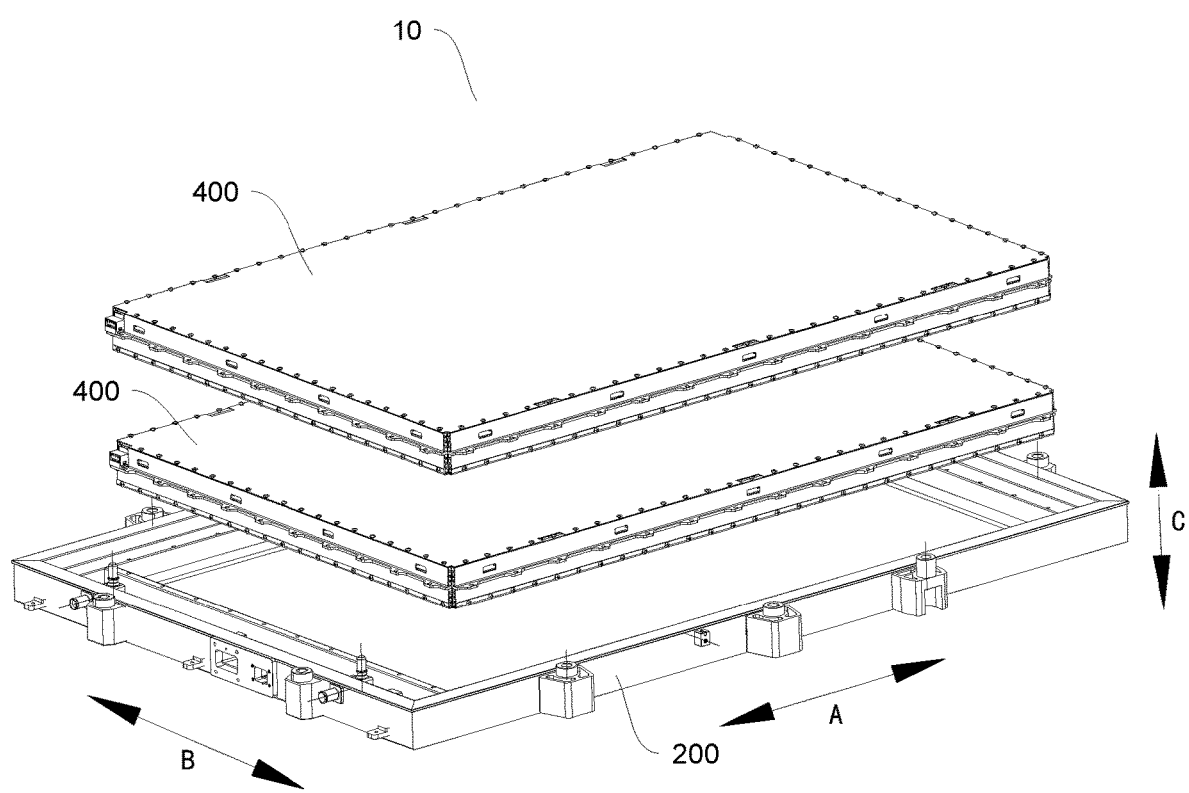
FIG. 7 is a schematic diagram of an arrangement manner of battery modules of a power battery pack according to another embodiment of this application.

In some specific examples of this application, as shown in FIG. 7, the length direction of the cell 100 is arranged along the width direction B of the power battery pack 10, the plurality of cells 100 are arranged along the length direction A of the power battery pack 10, to form a battery array, and at least two layers of battery arrays are arranged in the pack body 200 along the height direction C of the power battery pack 10. Therefore, a quantity of the cells 100 is optimized, so that the space utilization is improved, to improve the energy density, and BIC and low-pressure sampling is easier to implement centralized synthesis.

Figure 15:
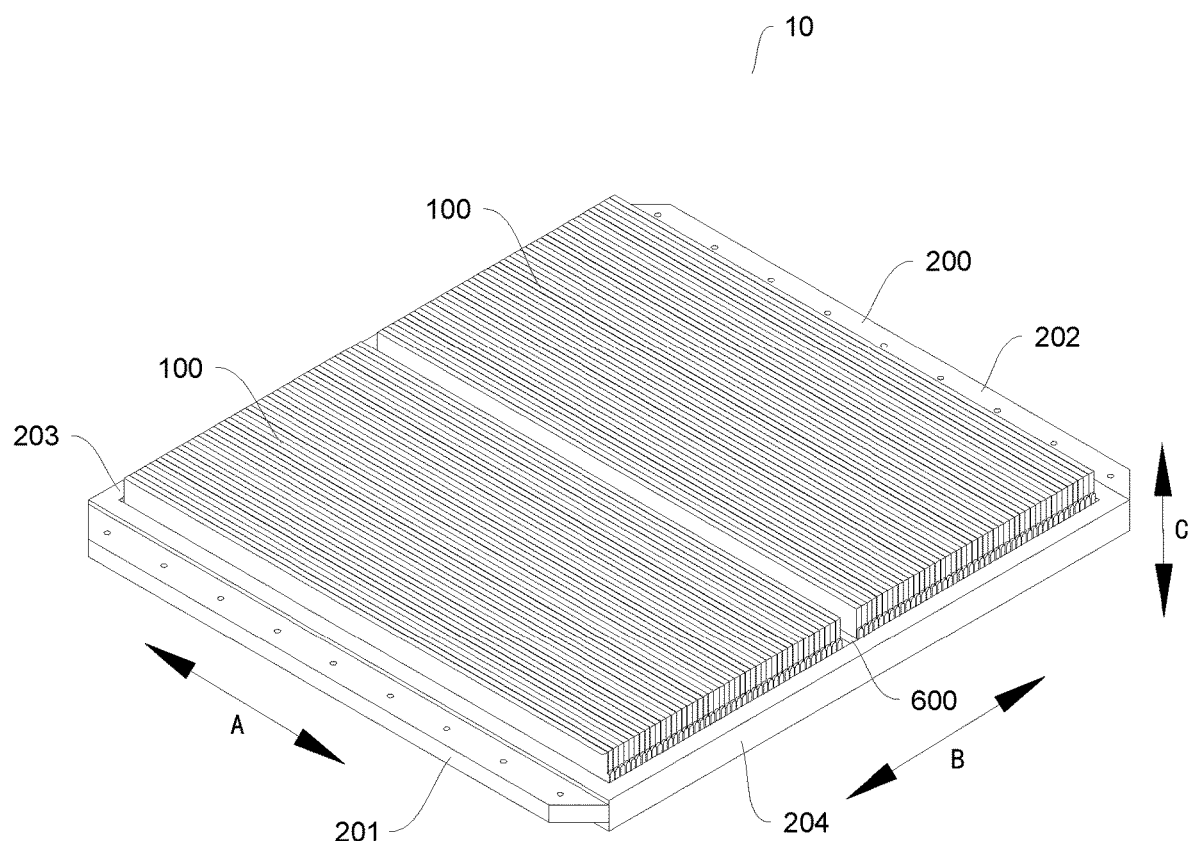
FIG. 15 is a three-dimensional diagram of a power battery pack according to a fourth optional embodiment of this application.
Figure 16:
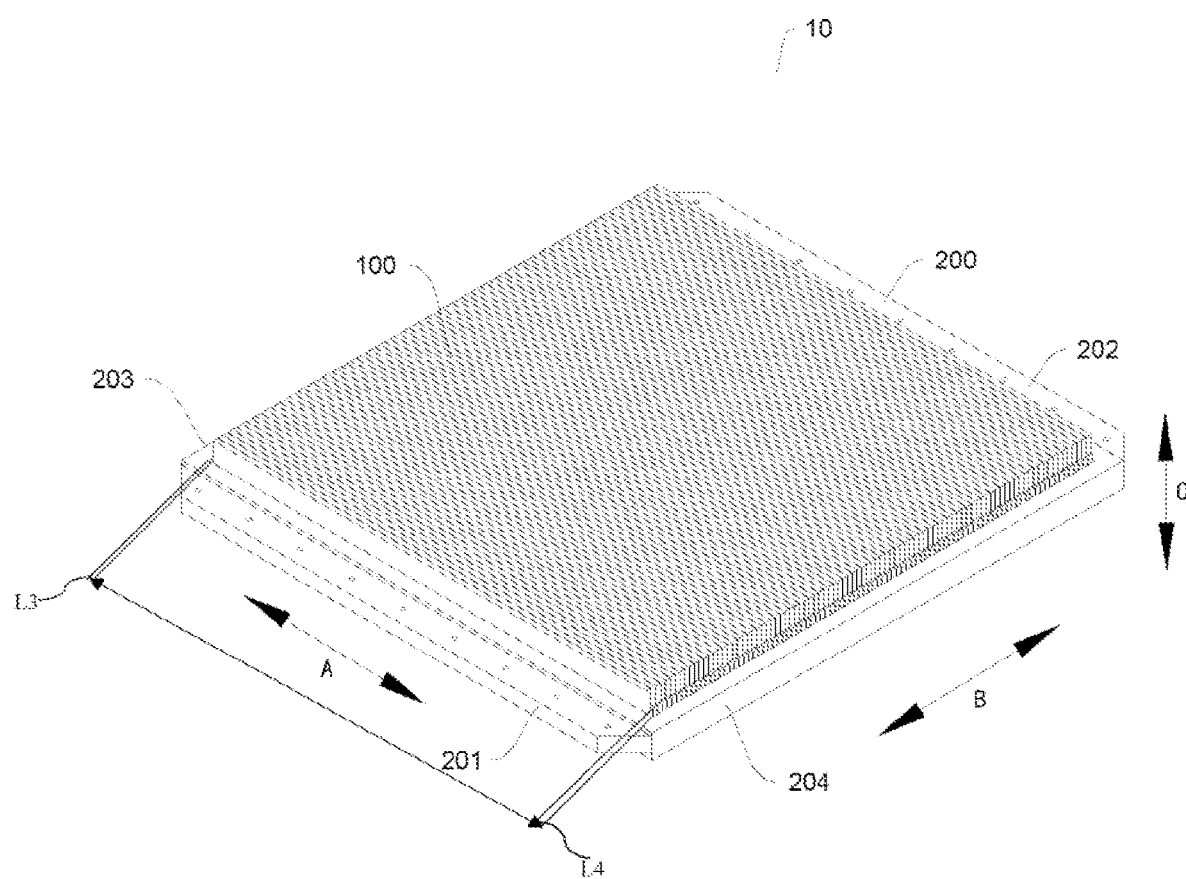
FIG. 16 is a three-dimensional diagram of a power battery pack according to a fifth optional embodiment of this application.

In some specific embodiments of this application, as shown in FIG. 15 to FIG. 16, the length direction of the cell 100 is arranged along the length direction A of the power battery pack 10, and the plurality of cells 100 are arranged along the width direction B of the power battery pack 10, facilitating in setting the space utilization of the power battery pack 10 to 50%, 60%, 62%, 65%, or a greater value.

In some specific examples of this application, as shown in FIG. 15 to FIG. 16, in the length direction A of the power battery pack 10, a distance between the cell 100 and an end wall of the pack body 200 is less than the length of the cell 100. Specifically, in the length direction A of the power battery pack 10, a shortest distance between an end of the cell 100 and an end beam of the pack body 200 close to the end of the cell 100 is L3, a shortest distance between an other end of the cell 100 and an end beam of the pack body 200 close to the other end of the cell 100 is L4, and the length $L_0$ of the cell 100 meets: $L3+L4<L_0$. In this way, another additional cell 100 cannot be accommodated in the length direction A of the power battery pack 10.

In other words, only one cell 100 is accommodated in the pack body 200 in the length direction A of the power battery pack 10. That is, in the length direction A of the power battery pack 10, two or more cells 100 cannot be arranged in the direction.

It may be understood that two sides of the pack body 200 are side beams in the width direction B of the power battery pack 10, and two ends of the pack body 200 are end beams in the length direction A of the power battery pack 10.

In some specific examples of this application, as shown in FIG. 15 and FIG. 16, the length of the cell 100 extends in the entire length direction A of the power battery pack 10. That is, the cell 100 extends from one end to an other end of the pack body 200 along the length direction A of the power battery pack 10, and the length of the cell 100 is filled in the length direction A of the power battery pack 10. Two or more cells 100 cannot be placed in the pack body 200 in the length direction A of the power battery pack 10, and two ends of the cell 100 in the length direction may fit two opposite end walls of the pack body 200 in the length direction A, for example, are fixed to the pack body 200. Therefore, no cross beam and longitudinal beam is needed inside the pack body 200, and connected cells 100 are directly used as a reinforcing rib, to greatly simplify the structure of the pack body 200, and reduce a space occupied by the reinforcing rib and a space occupied by a mounting structure of the cell 100, thereby improving a space utilization and endurance capacity.

Certainly, the embodiments of this application are not limited to the absence of a cross direction and a cross beam. In some embodiments of this application, as shown in FIG. 15, a longitudinal beam 600 may be disposed in the pack body 200, and the longitudinal beam 600 extends along the length direction A of the power battery pack 10. The plurality of cells 100 are arranged along the width direction B of the power battery pack 10 to form a battery array, and the longitudinal beam 600 divides the battery array into at least two parts along the width direction B of the power battery pack 10, each part of the battery array including at least one cell 100, and each part of the battery array forming a battery module 400.

Certainly, in some other embodiments of this application, a cross beam 500 may be further disposed in the pack body 200, and the cross beam 500 extends along the width direction B of the power battery pack 10. The length direction of the cell 100 is arranged along the length direction A of the power battery pack 10, and the plurality of cells 100 are arranged along the width direction B of the power battery pack 10 to form a battery array. At least two rows of battery arrays are arranged in the pack body 200 along the length direction A of the power battery pack 10, each row of battery array including a plurality of cells 100 arranged along the width direction B of the power battery pack 10, and the cross beam 500 being located between the two neighboring rows of battery arrays.

In some specific examples of this application, the pack body 200 includes end beams located at two ends of the power battery pack 10 in the length direction A, and two ends of the cell 100 in the length direction are supported by the end beams; and the pack body 200 includes lateral beams located at two sides of the power battery pack 10 in the width direction B, the lateral beam providing an inward pressing force for cells 100 close to the lateral beam.

As shown in FIG. 16, the pack body 200 includes a first side beam 201, a second side beam 202, a first end beam 203, and a second end beam 204. The first side beam 201, the first end beam 203, the second side beam 202, and the second end beam 204 are connected end to end sequentially. The first side beam 201 is opposite to the second side beam 202 in the width direction B of the power battery pack 10, and the first end beam 203 is opposite to the second end beam 204 in the length direction A of the power battery pack 10. The first end beam 203 and the second end beam 204 provide supporting forces for the two ends of the cell 100 in the length direction, that is, an end of the cell 100 is supported by the first end beam 203, and an other end of cell is supported by the second end beam 204. The first side beam 201 and the second side beam 202 provide pressing forces for two sides of cells 100 in a thickness direction. That is, the first side beam 201 applies a force, facing the second side beam 202, to cells 100 disposed close to the first side beam 201, and the second side beam 202 applies a force, facing the first side beam 201, to cells 100 disposed close to the second side beam 202, so that a plurality of cells 100 can be closely arranged between the first side beam 201 and the second side beam 202 along the width direction B of the power battery pack 10, and the plurality of cells 100 can fit each other. In addition, the first side beam 201 and the second side beam 202 may limit the plurality of cells 100 in the width direction B of the power battery pack 10. In particular, when the cells 100 slightly swell, the cells 100 can be buffered and provided with an inward pressure to prevent the cells 100 from swelling and deforming excessively.

In some specific examples of this application, as shown in FIG. 15, the length direction of the cell 100 is arranged along the length direction A of the power battery pack 10, the plurality of cells 100 are arranged along the width direction B of the power battery pack 10, to form a battery array, and at least two layers of battery arrays are arranged in the pack body 200 along the height direction C of the power battery pack 10. Therefore, a quantity of the cells 100 is optimized, so that the space utilization is improved, to improve the energy density, and BIC and low-pressure sampling is easier to implement centralized synthesis.

Figure 6:
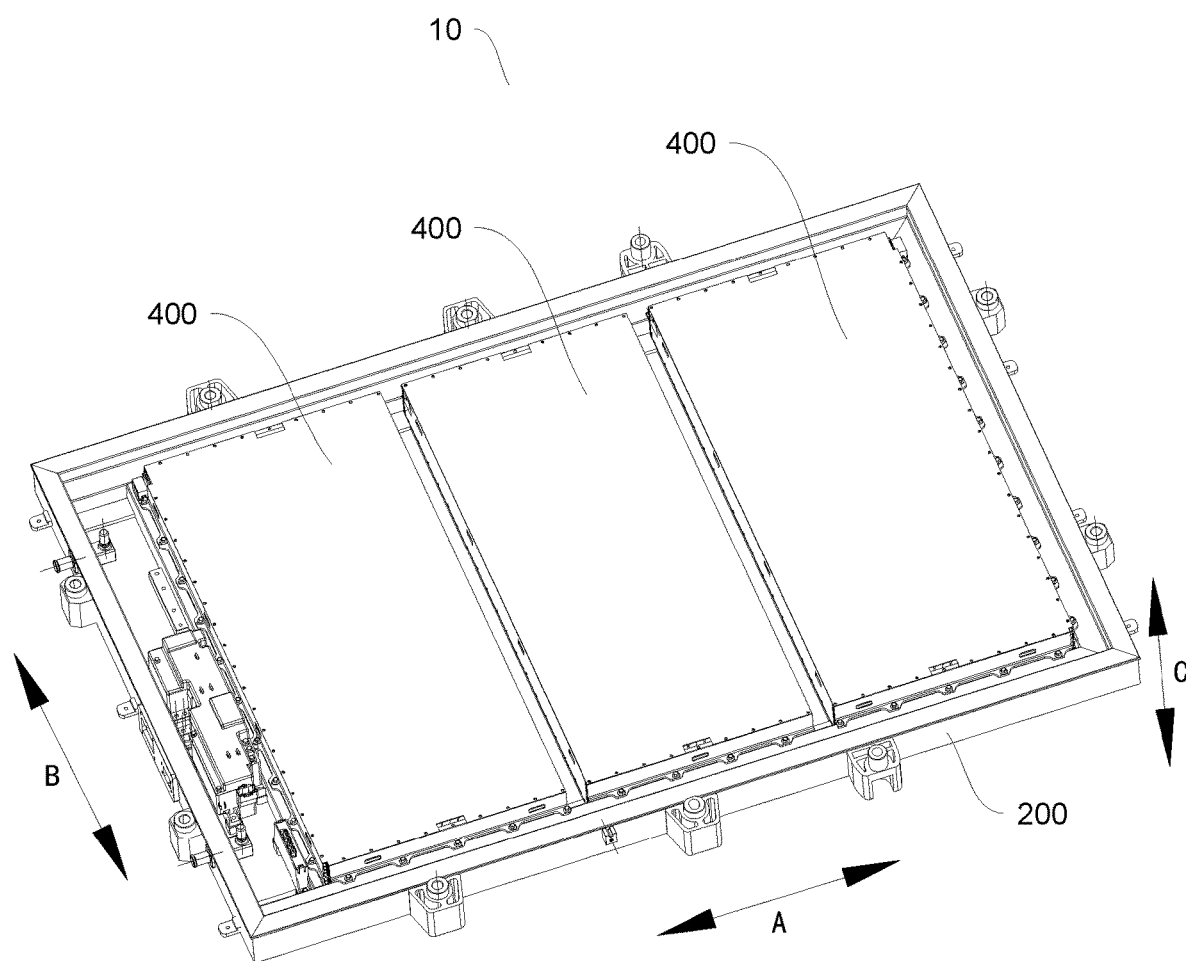
FIG. 6 is a schematic diagram of an arrangement manner of battery modules of a power battery pack according to an embodiment of this application.

In some specific embodiments of this application, the plurality of cells 100 may be assembled into a plurality of battery modules 400. The plurality of battery modules 400 may be arranged along the length direction A of the power battery pack 10 (as shown in FIG. 6). Alternatively, the plurality of battery modules 400 may be arranged along the width direction B of the power battery pack 10 (as shown in FIG. 15). Alternatively, the plurality of battery modules 400 may be arranged along the height direction C of the power battery pack 10 to form a multi-layer structure (as shown in FIG. 7). In other words, regardless of whether the cell 100 extends along the width direction B or the length direction A of the power battery pack 10, the plurality of cells 100 may be arranged along the height direction C of the power battery pack 10 into multi layers. Certainly, the plurality of battery modules 400 may be alternatively arranged along the length direction A and the height direction C of the power battery pack 10 simultaneously, or may be arranged along the width direction A and the height direction C of the power battery pack 10 simultaneously. Therefore, a quantity of the battery modules 400 is optimized, so that the space utilization is improved, to improve the energy density, and BIC and low-pressure sampling is easier to implement centralized synthesis. It needs to be understood that, end plates, side plates, or other structures are not disposed for the battery modules 400 in the embodiments of this application.

In the related art, because the cell has a relatively small size and a relatively short length, two opposite ends of the cell cannot fit two side walls disposed opposite to each other in the pack body 200". Therefore, a longitudinal beam 600' and/or a cross beam 500' (as shown in FIG. 1) needs to be disposed in the pack body 200", to facilitate assembly of the cell. When cells are mounted in the pack body 200" through a battery module 400', there are a plurality of cells along a width direction of the power battery pack 10'. In other words, the cell does not extend between the two opposite side walls, but extends between two opposite longitudinal beams 600' or cross beams 500'. The battery module is fixed to adjacent longitudinal beams 600' and/or cross beams 500' through a fastener.

Because the longitudinal beam 600' and/or the cross beam 500' are disposed in the pack body 200" in the related art, the longitudinal beam 600' and/or the cross beam 500' occupy a large mounting space for accommodating cells in the pack body 200", resulting in a relatively low space utilization of the pack body 200". Generally, a ratio of a sum of volumes of the cells to a volume of the pack body 200" is about 40% or even lower. In other words, in the related art, only about 40% of the space in the pack body 200" may be used for mounting the cells, resulting in a limited quantity of cells to be accommodated in the pack body 200", limiting a capacity and voltage of the entire power battery pack 10', and causing a poor endurance capacity of the power battery pack 10'. That the longitudinal beam 600' and/or the cross beam 500' are disposed in the pack body 200' in the related art refers to that the longitudinal beam 600' is disposed in the pack body 200', or the cross beam 500' is disposed in the pack body 200', or both the longitudinal beam 600' and the cross beam 500' are disposed in the pack body 200'.

According to the power battery pack 10 in the embodiments of this application, on one hand, the use of the longitudinal beam and/or the cross beam in the pack body 200 can be reduced, and even the longitudinal beam and/or cross beam may not be disposed in the pack body 200, thereby reducing a space occupied by the longitudinal beam and/or the cross beam in the pack body 200, and improving the space utilization of the pack body 200; on the other hand, the use of the end plate and the side plate in the battery module 400 can be reduced, thereby reducing a space occupied by the end plate and the side plate in the pack body 200, and improving the space utilization of the pack body 200. More cells 100 can be arranged in the pack body 200, thereby improving the capacity, voltage, and endurance capacity of the entire power battery pack. Reducing the use of the longitudinal beam and/or the cross beam in the pack body 200 refers to reducing the use of the longitudinal beam in the pack body 200, or reducing the use of the cross beam in the pack body 200, or reducing the use of the longitudinal beam and the cross beam in the pack body 200. That the longitudinal beam and/or the cross beam may not be disposed in the pack body 200 refers to that the longitudinal beam may not be disposed in the pack body 200, or the cross beam may not be disposed in the pack body 200, or neither the longitudinal beam nor the cross beam is disposed in the pack body 200. Reducing a space occupied by the longitudinal beam and/or the cross beam in the pack body 200 refers to reducing a space occupied by the longitudinal beam in the pack body 200, or reducing a space occupied by the cross beam in the pack body 200, or reducing a space occupied by the longitudinal beam and the cross beam in the pack body 200.

In addition, because there is no need to arrange the longitudinal beam and/or the cross beam in the pack body 200, on one hand, a manufacturing process of the pack body 200 is simplified, the assembly complexity of the cell 100 is reduced, and production costs are reduced; on the other hand, the weight of the pack body 200 and the entire power battery pack 10 is reduced, light weight of the power battery pack 10 is achieved. In particular, when the power battery pack 10 is mounted on an electric vehicle, the endurance capacity of the electric vehicle may be further improved, and light weight of the electric vehicle is achieved. That there is no need to arrange the longitudinal beam and/or the cross beam in pack body 200 refers to that there is no need to arrange the longitudinal beam in the pack body 200, or there is no need to arrange the cross beam in the pack body 200, or there is no need to arrange the longitudinal beam and the cross beam in the pack body 200.

Moreover, the cell 100 may be used for reinforcing the structural strength of the pack body 200. In other words, there is no need to further dispose a reinforcing structure in the pack body 200 to reinforce the structural strength of the pack body, and as a substitution of the reinforcing structure, the cell 100 may be directly used for ensuring the structural strength of the pack body 200, thereby ensuring that the pack body 200 is not easily deformed under the action of an external force. Compared with a battery pack disclosed in Chinese patent No. CN107925028A, the pack body 200 can not only accommodate and protect the cell 100, but also can support the cell 100, to improve the overall load-bearing capacity of the power battery pack 10, and the length of the cell 100 strengths the power battery pack 10. In addition, a surface area of a single cell 100 is increased, so that a heat dissipation area of the cell 100 may be increased. Therefore, the heat dissipation rate of the cell 100 is increased, thereby improving the security of the entire power battery pack 10, and making the power battery pack 10 safer and more reliable.

In some specific examples of this application, the cell 100 includes a battery body 110 (which may be understood as a body portion in addition to small-sized protrusion structures such as a tab). A volume V of the battery body 110 and energy E of the battery body 110 meet: $V/E \leq 2000 \text{ mm}^3 \cdot \text{Wh}^{-1}$. Therefore, not only a sufficient heat dissipation area is ensured, to ensure a heat dissipation effect, but also a volume proportion of the cells 100 may be reduced, facilitating compact arrangement of the plurality of cells 100 in the power battery pack 10.

Figure 9:
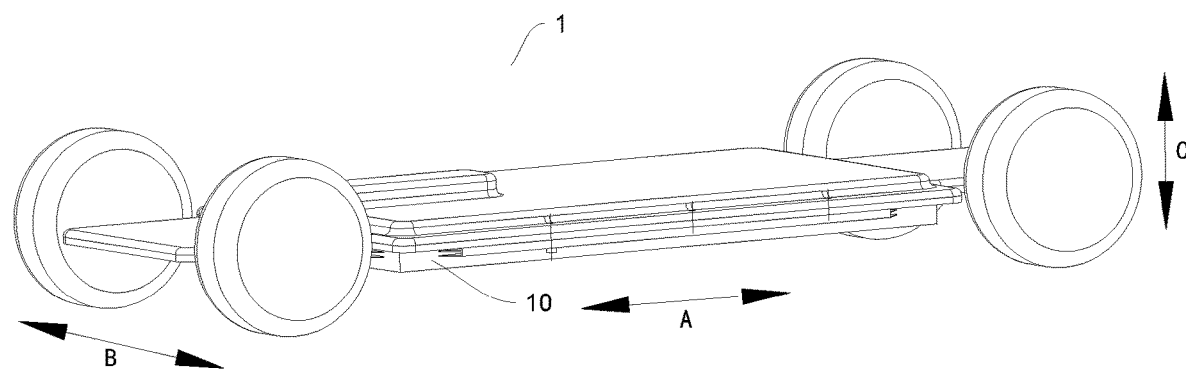
FIG. 9 is a schematic structural diagram of an electric vehicle according to an embodiment of this application.
Figure 10:
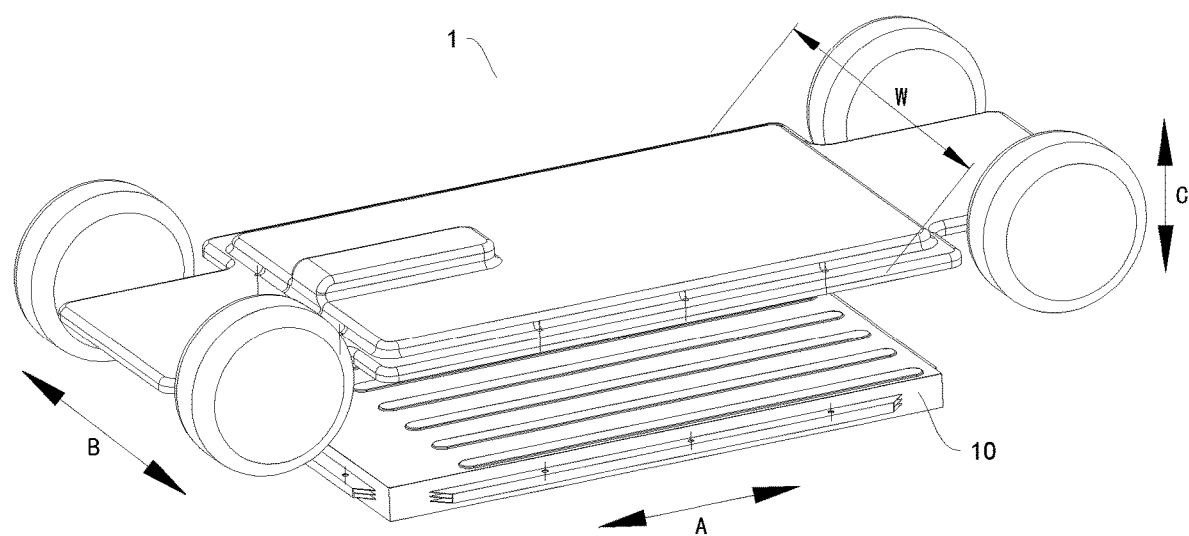
FIG. 10 is an exploded view of an electric vehicle according to an embodiment of this application.

In some specific embodiments of this application, as shown in FIG. 9 and FIG. 10, the pack body 200 is different from a housing of the battery pack disclosed in the Chinese patent No. CN107925028A, in particular, in terms of a size and load bearing. The pack body 200 may include a vehicle-use tray 210 connected to a vehicle body of the electric vehicle in a fitting manner, to form a structure that fit the vehicle or the vehicle body and that accommodates and carries the cells 100. The vehicle-use tray 210 is a tray that is separately produced and used for accommodating and mounting of the cells 100. When the cells 100 are mounted on the vehicle-use tray 210, the vehicle-use tray 210 may be mounted on the vehicle body through a fastener, for example, hanging on the chassis of the electric vehicle for accommodating and load bearing.

When the power battery pack 10 is used as a power battery pack used in a vehicle for providing electric energy, the length direction of the cell 100 may be arranged along a width direction of the vehicle body or a length direction of the vehicle body of the electric vehicle, that is, a left-right direction of the vehicle or a traveling direction of the vehicle. In this case, a length L of the battery body 110 of the cell 100 may range from 400 mm to 2500 mm, to enable the length of the cell 100 to fit a size of the vehicle in the width direction or a size of the vehicle in the length direction.

Figure 8:
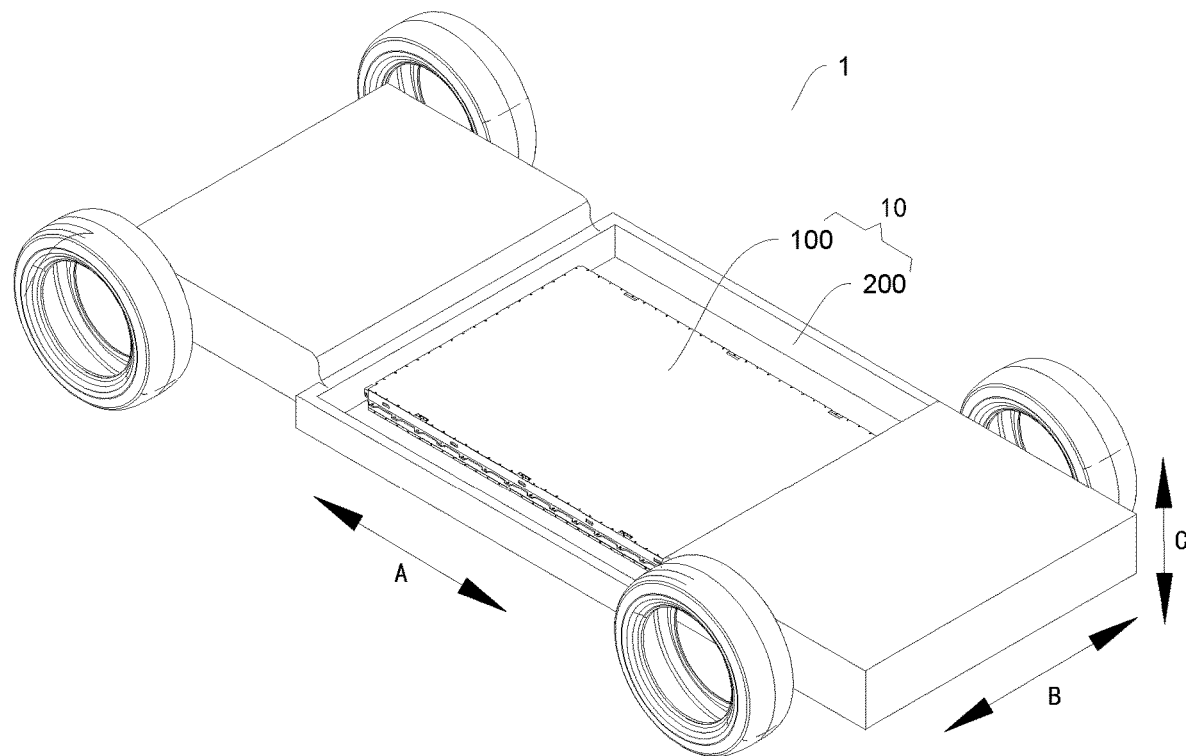
FIG. 8 is a schematic structural diagram of a pack body of a power battery pack being formed on an electric vehicle according to an embodiment of this application.

In some specific examples of this application, as shown in FIG. 8, the pack body 200 may be alternatively directly formed on the electric vehicle. In other words, the pack body 200 is a device that is formed at any appropriate position on the electric vehicle and in which the cell 100 is mounted. For example, the pack body 200 may be formed on the chassis of the electric vehicle.

In some specific embodiments of this application, when the power battery pack 10 is arranged on the electric vehicle, different from the battery pack disclosed in the Chinese patent No. CN107925028A, the power battery pack 10 further includes at least one of a battery management system (BMS), a battery connector, a battery sampler, and a battery thermal management system, or other components required by a vehicle-use battery. The width direction B of the power battery pack 10 is arranged along the width direction of the vehicle body of the electric vehicle, that is, a left-right direction of the vehicle, and the length direction of the power battery pack 10 is arranged along the length direction of the vehicle body, that is, a front-rear direction of the vehicle. Certainly, this application is not limited thereto. The width direction B of the power battery pack 10 may be alternatively arranged along the length direction of the vehicle body of the electric vehicle, and the length direction A of the power battery pack 10 may be arranged along the width direction of the vehicle body of the electric vehicle.

It may be understood by a person skilled in the art that arrangement of a direction of the cells 100 in the power battery pack 10 and arrangement of a direction of the power battery pack 10 on the electric vehicle may be combined in different manners. For example, the length direction of the cell 100 may be arranged along the width direction B of the power battery pack 10, or arranged along the length direction A of the power battery pack 10; and the width direction B of the power battery pack 10 may be arranged along the width direction of the vehicle body of the electric vehicle, or arranged along the length direction of the vehicle body. In another example, regardless of whether the width direction B of the power battery pack 10 is arranged along the width direction of the vehicle body of the electric vehicle or arranged along the length direction of the vehicle body, the length direction of the cell 100 is arranged along the width direction of the vehicle body of the electric vehicle. Relative arrangement directions of the cell 100, the power battery pack 10, and the vehicle body may be set according to actual applications, to meet different requirements.

The cell 100 in the embodiments of this application is described below with reference to the accompanying drawings.

In the following specific embodiments, a length L, a width H, and a thickness D are all measured in millimeter (mm), a surface area S is measured in square millimeter (mm$^2$), a volume V is measured in cubic millimeter (mm$^3$), and energy E is measured in watt per hour (Wh).

Figure 5:
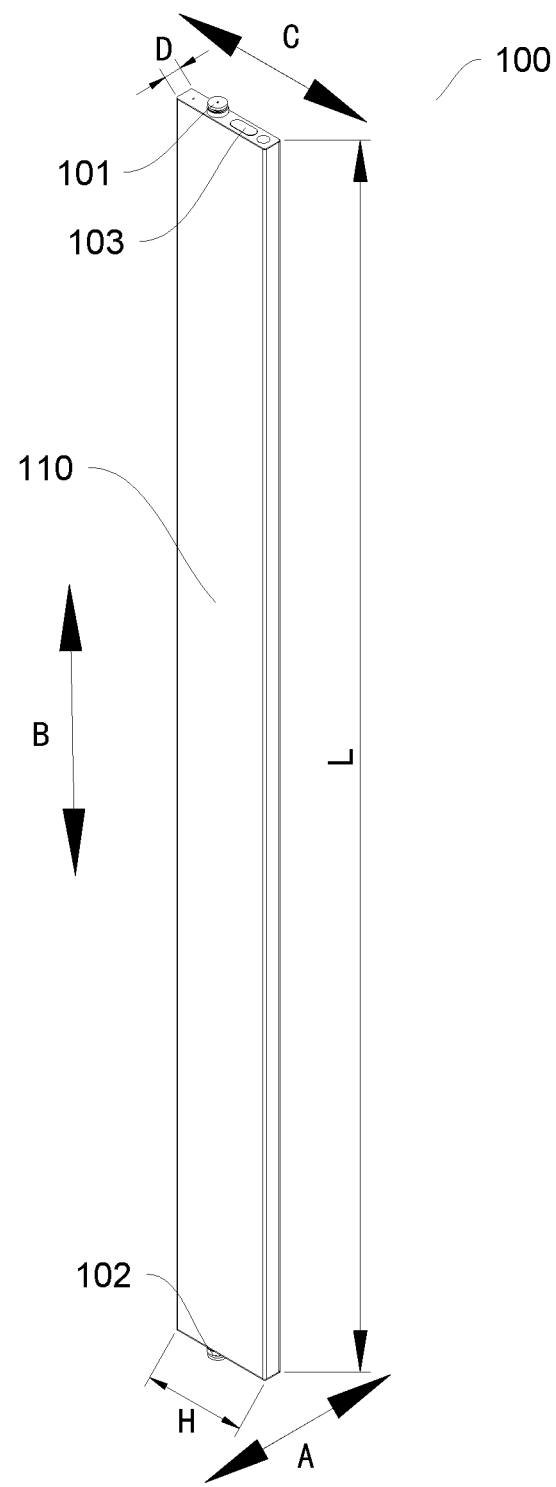
FIG. 5 is a schematic structural diagram of a cell according to an embodiment of this application.

As shown in FIG. 5, the cell 100 according to the embodiments of this application includes a battery body 110. It may be understood that, the battery body 110 is a main portion in addition to small-sized protrusion structures such as a tab). The battery body 110 has a length L, a width H, and a thickness D.

According to the embodiments of this application, the length L of the battery body 110 is greater than the width H of the battery body 110, the width H of the battery body 110 is greater than the thickness D of the battery body 110, and the length L of the battery body 110 and the width H of the battery body 110 meet: L/H=4 to 21. According to some other embodiments of this application, the length L of the battery body 110 and the width H of the battery body 110 meet: L/H=9 to 13.

According to the cell 100 in the embodiments of this application, by designing a ratio of the length L to the width D of the battery body 110, the battery body 110 may be reasonably flattened and elongated under a certain volume. On one hand, it facilitates overall arrangement in the power battery pack (for example, implementing the arrangement of the power battery pack 10 according to the foregoing embodiments of this application), thereby improving the space utilization of the power battery pack, expanding the energy density of the power battery pack, and further enhancing the endurance capacity of the power battery pack; on the other hand, it can be ensured that the cell 100 has a sufficiently large heat dissipation area, and can promptly conduct heat inside the cell to the outside, to prevent the heat from gathering inside the cell, thereby matching relatively high energy density, and supporting the improvement of the endurance capacity.

According to some embodiments of this application, to optimize the arrangement of the cells 100 in the power battery pack, and improve the heat dissipation capacity of the cells 100, the length L and the thickness D of the battery body 110 meet: L/D=23 to 208. According to some specific embodiments of this application, the length L and the thickness D of the battery body 110 meet: L/D=23 to 200. According to some specific embodiments of this application, the length L and the thickness D of the battery body 110 meet: L/D=50 to 70.

In some specific embodiments of this application, as shown in FIG. 5, the battery body 110 is a cuboid structure with a smooth outer surface, which has certain structural strength. For example, a pole core of a battery is inputted into a square battery housing, an opening portion of the battery housing is sealed by using a cover plate, and an electrolyte solution is injected. Compared with a battery with an aluminum-plastic compound film, a heat-conducting property of the cell 100 according to the embodiments of this application is good, and a conventional battery thermal management structure is also used, which can effectively avoid the heat dissipation problem brought by a large-size structure. Compared with a cylindrical cell, the space utilization is higher, and the process of production and assembly is easier.

When the cells 100 according to the embodiments of this application are arranged in the pack body 200 of the power battery pack 10, a length direction and a thickness direction of the battery body 110 may extend along a horizontal direction, and a width direction of the battery body 110 can extend along a vertical direction, that is, the cells 100 are placed sideways. Both the horizontal direction and the vertical direction are subject to a direction of the power battery pack 10 during use (for example, when the power battery pack is applied to the electric vehicle).

In some specific examples of this application, to improve the energy density and the endurance capacity by optimizing the arrangement of the cells 100 in the power battery pack 10, other parameters of the cell 100 are designed, to enable the arrangement of the battery body 110 to be compact and energy to be more concentrated in the limited space of the pack body 200.

According to some embodiments of this application, the length L of the battery body 110 and a volume V of the battery body 110 meet: L/V=0.0005 $mm^{-2}$ to 0.002 $mm^{-2}$. According to some embodiments of this application, the width H of the battery body 110 and the volume V of the battery body 110 meet: H/V=0.0001 $mm^{-2}$ to 0.00015 $mm^{-2}$. According to some embodiments of this application, the thickness D of the battery body 110 and the volume V of the battery body 110 meet: D/V=0.0000065 $mm^{-2}$ to 0.00002 $mm^{-2}$. Therefore, for the battery body 110 with a certain volume, a proportion of each of the length L, the width H, and the thickness D to the volume V is designed, to optimize the distribution of energy per unit quantity in the space, thereby facilitating the arrangement in the pack body 200.

According to some embodiments of this application, the length L of the battery body 110 and a surface area S of the battery body 110 meet: L/S=0.002 $mm^{-1}$ to 0.005 $mm^{-1}$. According to some embodiments of this application, the length L of the battery body 110 and energy E of the battery body 110 meet: L/E=0.8 $mm \cdot Wh^{-1}$ to 2.45 $mm \cdot Wh^{-1}$. According to some embodiments of this application, the length L of the battery body 110 and the energy E of the battery body 110 meet: L/E=1.65 $mm \cdot Wh^{-1}$ to 2.45 $mm \cdot Wh^{-1}$. In this way, it facilitates that the cell 100 cross two opposite sides of the pack body 200 in the length direction of the cell, to improve the endurance capacity of the power battery pack 10, and maintain the structural strength and the heat dissipation effect of the cell 100.

In some other examples of this application, the surface area S of the battery body 110 and the volume V of the battery body 110 meet: S/V=0.1 to 0.350.1 to 0.35 $mm^{-1}$. Therefore, not only a sufficient heat dissipation area is ensured, to ensure a heat dissipation effect, but also a volume proportion of the cells 100 may be reduced, facilitating compact arrangement of the plurality of cells 100 in the power battery pack 10.

According to a specific embodiment of this application, the surface area S of the battery body 110 and the energy E of the battery body 110 meet: S/E≤1000. For example, S/E≤1000 $mm^2 \cdot Wh^{-1}$. In this way, it can be ensured that the surface of the cell 100 has a sufficient heat dissipation area, and in particular, when the power battery uses a ternary or high-nickel ternary cathode material, the heat inside the battery can be promptly conducted, facilitating the security of the battery. In addition, the cell 100 in the embodiments of this application is a square battery having a smooth outer surface, certain structural strength, and a good metal heat conducting performance. Compared with a battery of which a surface area is increased by setting corrugation, the process and subsequent assembly have a relatively small difficulty.

In some specific embodiments of this application, as shown in FIG. 5, the cell 100 further includes a first tab 101 and a second tab 102.

The first tab 101 is disposed on an end of the battery body 110 in the length direction of the battery body, and the second tab 102 is disposed on an other end of the battery body 110 in the length direction of the battery body. In other words, the length direction of the cell 100 may be a current direction inside the cell 100, that is, the current direction inside the cell 100 is shown as the arrow B. In this way, because the current direction is the same as the length direction of the cell 100, the cell 100 has a larger effective heat dissipation area and better heat dissipation efficiency. The first tab 101 may be an anode tab of the cell 100, and the second tab 102 is a cathode tab of the cell 100. Alternatively, the first tab 101 is a cathode tab of the cell 100, and the second tab 102 is an anode tab of the cell 100.

In some specific examples of this application, as shown in FIG. 5, the cell 100 further includes an explosion-proof valve 103.

The explosion-proof valve 103 is disposed on at least one end of the battery body 110 in the length direction of the battery body. When a fault occurs in the cell 100, an air pressure inside the cell 100 is increased, and the explosion-proof valve 103 is started, to prevent explosion of the cell 100.

It may be understood by a person skilled in the art that the setting of the explosion-proof valve 103 may be not only applied to a hard-housing battery, such as a battery with an aluminum housing, but also may be applied to a pouch battery. In addition, the explosion-proof valve 103 may be alternatively disposed at other position than an end portion of the battery body 100.

In some specific embodiments of this application, two ends of the battery body 110 in the length direction of the battery body are respectively provided with an explosion-proof valve 103.

Figure 11:
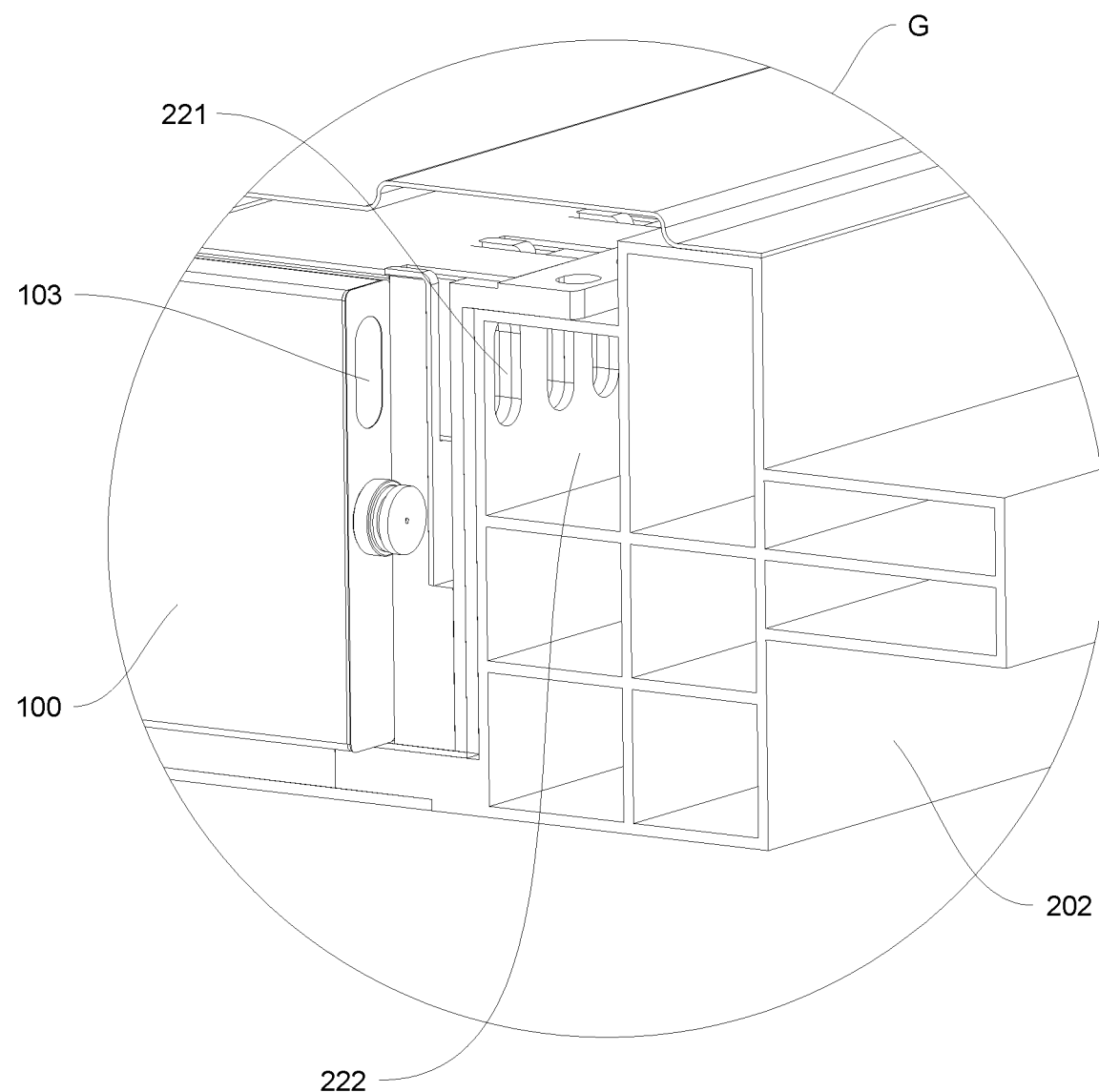
FIG. 11 is an enlarged view of a region G in FIG. 2.

For example, as shown in FIG. 2, FIG. 5 and FIG. 11, an explosion-proof valve 103 is disposed on a first end of the cell 100 facing the first side beam 201, an exhaust channel 222 is provided inside the first side beam 201, the first side beam 201 is provided with an air inlet 221 at a position corresponding to the explosion-proof valve 103 of each cell 100, the air inlet 221 is in communication with the exhaust channel 222, and the pack body 200 is provided with an air outlet in communication with the exhaust channel 222; and/or an explosion-proof valve 103 is disposed on a second end of the cell 100 facing the second side beam 202, an exhaust channel 222 is provided inside the second side beam 202, the second side beam 202 is provided with an air inlet 221 at a position corresponding to the explosion-proof valve 103 of each cell 100, the air inlet 221 is in communication with the exhaust channel 222, and the pack body 200 is provided with an air outlet in communication with the exhaust channel 222.

In the related art, during use of the cell, if the air pressure inside the cell increases to a certain degree, the explosion-proof valve is opened. Flame, smoke, or gas inside the cell is exhausted through the explosion-proof valve. The flame, smoke, or gas gathers inside the power battery pack and causes secondary damage to the cell if not exhausted in time. In the embodiments of this application, because the first side beam 201 and/or the second side beam 202 are provided with the air inlet 221 corresponding to the explosion-proof valve 103 of each cell 100, and the first side beam 201 and/or the second side beam 202 are provided inside with the exhaust channel 222, when the air pressure inside the cell 100 increases, the explosion-proof valve 103 of the cell is opened. Flame, smoke, or gas inside the cell directly enters the exhaust channel 222 in the first side beam 201 and/or the second side beam 202 through the air inlet 221, and is exhausted out of the first side beam 201 and/or the second side beam 202 through the air outlet, for example, exhausted into the atmosphere through the air outlet. In this way, the flame, smoke or gas does not gather inside the pack body 200, to prevent the flame, smoke or gas from causing secondary damage to the cell 100.

In addition, an end of each of the plurality of cells 100 exhausts gas through the exhaust channel 222 in the first side beam 201, and an other end of each of the plurality of cells 100 exhausts gas through the exhaust channel 222 in the second side beam 202. Therefore, two ends of the cell 100 exhausts gas through different channels, which increases a gas exhaust distance, and exhausts gas in a cross manner, thereby reducing the temperature.

An electric vehicle 1 according to the embodiments of this application is described with reference to the accompanying drawings. The electric vehicle may include electric vehicles that need a power battery pack to provide electric energy for driving the electric vehicles, such as a commercial vehicle, a special vehicle, an electric bicycle, an electric motorcycle, and an electric scooter.

As shown in FIG. 9 and FIG. 10, the electric vehicle 1 according to the embodiments of this application includes the power battery pack 10 according to the foregoing embodiments of this application. The pack body 200 may be integrally formed on the electric vehicle. Alternatively, the pack body 200 may be a vehicle-use tray that is separately produced and used for accommodating and mounting of the cells 100.

In the electric vehicle 1 according to the embodiments of this application, the power battery pack 10 according to the foregoing embodiments of this application is used, which can improve the endurance capacity without expanding a battery occupation space.

In some specific embodiments of this application, as shown in FIG. 9 and FIG. 10, the power battery pack 10 is disposed at the bottom of the electric vehicle 1, and the pack body 200 is fixedly connected to a chassis of the electric vehicle 1. Because the chassis of the electric vehicle 1 has a relatively large mounting space, as many as cells 100 may be accommodated by disposing the power battery pack 10 on the chassis of the electric vehicle 1, thereby improving the endurance capacity of the electric vehicle 1.

In some specific examples of this application, as shown in FIG. 9 and FIG. 10, the electric vehicle 1 includes one power battery pack 10 disposed at the bottom of the electric vehicle 1, and the pack body 200 is fixedly connected to a chassis of the electric vehicle 1. A width direction of the power battery pack 10 is arranged along a width direction of a vehicle body of the electric vehicle 1, that is, a left-right direction of the electric vehicle 1, and a length direction of the power battery pack 10 is arranged along a length direction of the vehicle body of the electric vehicle 1, that is, a front-rear direction of the electric vehicle 1. A length direction of the cell 100 is arranged along the width direction of the power battery pack 10, and the plurality of cells 100 are arranged along the length direction of the power battery pack 10 to form a battery array. In another embodiment, the electric vehicle 1 may include a plurality of power battery packs 10 disposed at the bottom of the electric vehicle 1. The plurality of power battery packs 10 may have the same or different shapes and sizes. Each power battery pack 10 may be adjusted according to a shape and size of the chassis of the electric vehicle 1, and the plurality of power battery packs 10 are arranged along the length direction of the vehicle body, that is, the front-rear direction.

In some specific examples of this application, a ratio of width F of the pack body 200 to a width W of the vehicle body meet: $50\% \leq F/W \leq 80\%$.

In some specific examples of this application, the cell 100 includes a battery body 110, a length L of the battery body 110 ranging from 400 mm to 1500 mm.

In some embodiments of this application, the electric vehicle 1 includes one power battery pack 10 disposed at the bottom of the electric vehicle. A width direction of the power battery pack 10 is arranged along a width direction of a vehicle body of the electric vehicle 1, and a length direction of the power battery pack 10 is arranged along a length direction of the vehicle body of the electric vehicle 1. A length direction of the cell 100 is arranged along the width direction of the power battery pack, and the plurality of cells 100 are arranged along the length direction of the power battery pack 10 to form a battery array. The cell 100 includes a battery body 110, a length L of the battery body 110 ranging from 400 mm to 1500 mm.

In some specific examples of this application, the cell 100 includes a battery body 110, a length L of the battery body 110 in the width direction of the power battery pack 10 and a width W of the vehicle body meeting: $46\% \leq L/W \leq 76\%$. In the foregoing embodiments, the foregoing size requirement may be achieved by disposing only one pack body 200 along the width direction of the vehicle body. In another possible implementation, in a case that such a size requirement is met, in some embodiments, the length L of the battery body 110 ranges from 2000 mm to 2500 mm. Usually, for most vehicles, the width W of the vehicle body ranges from 500 mm to 2000 mm, for example, 500 mm, 1600 mm, 1800 mm, and 2000 mm, and the length of the vehicle body ranges from 500 mm to 5200 mm. For a passenger vehicle, a width of the passenger vehicle usually ranges from 500 mm to 1800 mm, and a length of the vehicle body ranges from 500 mm to 5200 mm, for example, 2000 mm, 2500 mm, 3000 mm, 3500 mm, 4000 mm, 4500 mm, 4700 mm, 5000 mm, and 5200 mm. Alternatively, the length of the vehicle body may range from 500 mm to 5000 mm, or 500 mm to 4700 mm.

According to some specific embodiments of this application, the electric vehicle 1 includes one power battery pack 10 disposed at the bottom of the electric vehicle 1. A width direction of the power battery pack 10 is arranged along a width direction of a vehicle body of the electric vehicle 1, and a length direction of the power battery pack 10 is arranged along a length direction of the vehicle body of the electric vehicle 1. A length direction of the cell 100 is arranged along the length direction of the power battery pack 10, and the plurality of cells 100 are arranged along the width direction of the power battery pack 10 to form a battery array.

According to some specific embodiments of this application, the electric vehicle 1 includes one power battery pack 10 disposed at the bottom of the electric vehicle 1. A width direction of the power battery pack 10 is arranged along a width direction of a vehicle body of the electric vehicle 1, and a length direction of the power battery pack 10 is arranged along a length direction of the vehicle body of the electric vehicle 1. A length direction of the cell 100 is arranged along the length direction of the power battery pack 10, and the plurality of cells 100 are arranged along the width direction of the power battery pack 10 to form a battery array. The cell 100 includes a battery body 110, a length L of the battery body 110 ranging from 1500 mm to 2500 mm.

According to some specific embodiments of this application, the electric vehicle 1 includes one power battery pack 10 disposed at the bottom of the electric vehicle 1. A width direction of the power battery pack 10 is arranged along a width direction of a vehicle body of the electric vehicle 1, and a length direction of the power battery pack 10 is arranged along a length direction of the vehicle body of the electric vehicle 1. A length direction of the cell 100 is arranged along the length direction of the power battery pack 10, and the plurality of cells 100 are arranged along the width direction of the power battery pack 10 to form a battery array. The cell 100 includes a battery body 110, a length L of the battery body 110 ranging from 2000 mm to 2500 mm.

According to some specific embodiments of this application, the cell 100 includes a battery body 110, a length L of the battery body 110 in the length direction of the power battery pack 10 and a length X of the vehicle body meeting: $40\% \leq L/X \leq 76\%$.

In some other embodiments of this application, a width F of the pack body 200 ranges from 500 mm to 1500 mm, which is much greater than that of the housing of the battery pack disclosed in the Chinese patent No. CN107925028A, to facilitate in accommodating the battery module 400 of the battery pack in the patent No. CN107925028A, thereby ensuring the endurance capacity, and fitting the size of the vehicle body.

In some specific examples of this application, the cell 100 includes a battery body 110, and a ratio of a length L of the battery body 110 to a width W of the vehicle body meets: $46\% \leq L/W \leq 76\%$. In this embodiment, the ratio may be achieved by disposing only one cell 100 along the width direction of the vehicle body. In another possible implementation, in a case that such a size requirement is met, the ratio may be achieved by disposing a plurality of battery modules 400 or a plurality of cells 100 in the length direction. In some embodiments, the length L of the battery body 110 ranges from 400 mm to 1500 mm.

Other configurations and operations of the cell 100, the power battery pack 10, and the electric vehicle 1 according to the embodiments of this application are known to a person of ordinary skill in the art and are not be described in detail herein.

Based on the foregoing, compared with the prior art, a size of a cell may be designed to be longer in this application, up to 2500 mm. A technical effect brought by applying the cell to the battery pack is shown in the following.

(1) A volume utilization of the battery pack is significantly improved, and volume energy density of the battery pack is increased: a current volume utilization in the industry is about 40%, and it is designed that cells may be distributed in an entire interior of the battery pack, so that the volume utilization may be increased to more than 60%, even to 80%, and the volume energy density of the battery pack is increased by more than 20%. For the same vehicle, by using the battery and arrangement method of the present invention, the energy can be increased by 20% to 30%, and a quantity of kilometers the vehicle can run may further be increased by 20% to 30%.

(2) Costs of the battery pack are significantly reduced: a cell itself can bear mechanical strengthening, so that a reinforcing rib of a battery tray may be saved or reduced, and a manufacturing process of the battery pack is simple to reduce manufacturing costs. In addition, sizes of the cells in this application may be matched with the sizes of the battery pack, and the cells may be directly arranged in parallel in the battery pack. There is no need to arrange a plurality of cells in parallel in a module frame enclosed by two end plates and two side plates and assemble a battery module to a battery pack in the prior art. Sizes of the cells in this application are long enough, so that a plurality of cells may be directly arranged in parallel in the battery pack, eliminating or reducing the end plate and the side plate used in assembly of the battery module, and a large quantity of fasteners such as screws for fixing and mounting the battery module, so that the cell is assembled easier, saving a large amount of manpower, materials, and other manufacturing costs, better facilitating popularization of the electric vehicle.

(3) Stability and reliability of the battery pack are increased: a more complicated battery pack assembly process indicates a higher probability of a defective rate. A possibility that the battery pack becomes loose and is not firmly mounted is further increased, adversely affecting quality of the battery pack, and reducing stability and reliability of the battery pack. By using the cells in this application to assemble into a battery pack, as the assembly process becomes simpler, the stability and reliability of the battery pack increases, and a defective rate of the battery pack decreases.

(4) Heat dissipation performance and safety of the battery pack are significantly improved: temperature rise of the battery pack is the result of both heat production and heat dissipation. Under the premise of the same capacity, quantity of heat production of the cell becomes a fixed value. In this application, the cell is generally flattened and elongated to achieve a better heat dissipation effect of the cell and reduce a temperature rise of the cell. Under the premise of a certain working condition of the battery, the temperature rise of the battery pack is reduced by using the cell, thereby further greatly improving safety performance of the battery pack.

Based on a significant technical effect brought by the longer cell, to achieve the support of the cell for itself, support strength of the housing may be improved through improvement of a molding process and structural design, and the like, and an aspect ratio of the housing is controlled within a predetermined range. In this case, internal resistance of the cell may be reduced by optimizing a current collection path and the like. In addition, a liquid injection process may further be improved to resolve the problem of long liquid injection time caused by a longer size of the cell.

Description is performed below through Comparative example 1 and Embodiments 1 and 2, Comparative example 2 and Embodiments 3 and 4, and Comparative example 3 and Embodiments 5 and 6. According to the power battery pack 10 in the embodiments of this application, energy density and the like are improved through design of arrangement and a size parameter, and the like of the cell 100.

The embodiments and comparative examples below all use a lithium iron phosphate battery with a quantity of electricity being 73 kwh as an example.

In Comparative example 1, Embodiment 1, and Embodiment 2, a total volume of the battery pack is 213 L. A sum of volumes of a pack body of the battery pack, an internal battery management system, and other power distribution modules is 58 L, the actual remaining volume of the battery pack that can accommodate cells, a cross beam, and a longitudinal beam is 155 L, and a volume of a power distribution box is 22.5 L. A length of the pack body is 1380 mm, a width is 1005 mm, and a thickness is 137 mm. The total volume of the battery pack 213 L=1380×1005×137× 0.000001+22.5. A width direction of the power battery pack is arranged along a width direction of a vehicle body, and a length direction of the power battery pack is arranged along a length direction of the vehicle body. A width of the vehicle body is 1880 mm.

Comparative Example 1

For the power battery pack 10' in the prior art, as shown in FIG. 1, two cross beams 500' and one longitudinal beam 600' are disposed in the pack body 200". The two cross beams 500' and one longitudinal beam 600' divide a cell into six battery packs 400', each of the battery packs 400' having a side plate and an end plate.

Embodiment 1

For the power battery pack 10 in this embodiment of this application, as shown in FIG. 13, the length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to an other side of the pack body 200 in the width direction B of the power battery pack 10. One cross beam 500 and no longitudinal beam 600 is disposed in the pack body 200, and the cross beam 500 extends along the width direction B of the power battery pack 10. The plurality of cells 100 are arranged along the length direction A of the power battery pack 10 to form a battery array, and the cross beam 500 divides the battery array into at least two parts along the length direction A of the power battery pack 10. A first side beam 201 and a second side beam 202 of the pack body 200 located at two sides of the power battery pack 10 in the width direction B provide supporting forces for the cells 100, and a first end beam 203 and a second end beam 204 of the pack body 200 located at two ends of the power battery pack 10 in the length direction A provide inward pressing forces for neighboring cells 100. One layer of battery array is arranged in the pack body 200 in the height direction C of the power battery pack 10. Neither an end plate nor a side plate is disposed for the battery array (or understood as a battery module) of the power battery pack 10.

Embodiment 2

Figure 14:
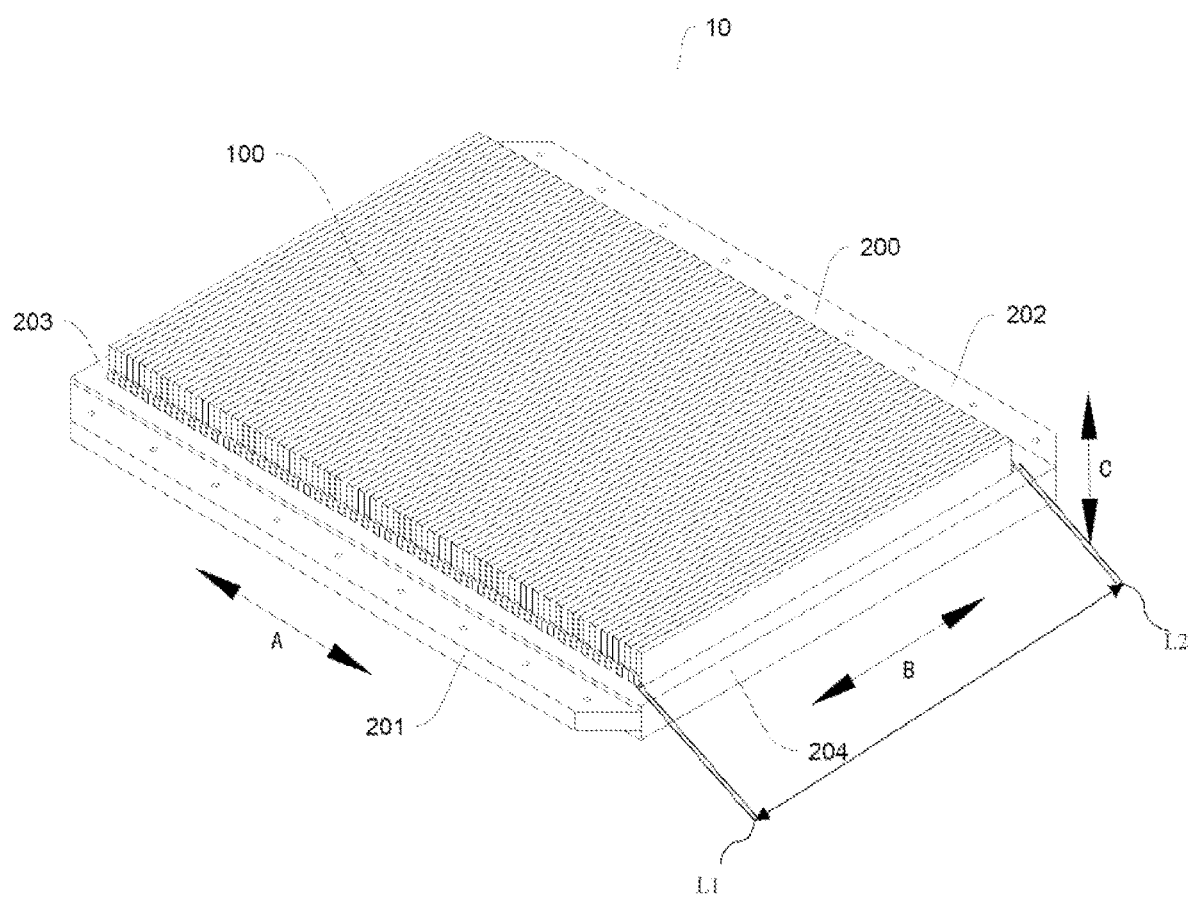
FIG. 14 is a three-dimensional diagram of a power battery pack according to a third optional embodiment of this application.

For the power battery pack 10 in this embodiment of this application, as shown in FIG. 14, the length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to an other side of the pack body 200 in the width direction B of the power battery pack 10. Neither a cross beam 500 nor a longitudinal beam 600 is disposed in the pack body 200. A first side beam 201 and a second side beam 202 of the pack body 200 located at two sides of the power battery pack 10 in the width direction B provide supporting forces for the cells 100, and a first end beam 203 and a second end beam 204 of the pack body 200 located at two ends of the power battery pack 10 in the length direction A provide inward pressing forces for neighboring cells 100. One layer of battery array is arranged in the pack body 200 in the height direction C of the power battery pack 10. Neither an end plate nor a side plate is disposed for the battery array (or understood as a battery module) of the power battery pack 10.

It may be known by a person skilled in the art by comparing the foregoing Comparative example 1 and Embodiments 1 to 3 that, compared with the power battery pack 10' in the prior art, for the power battery pack 10 according to the embodiments of this application, the space utilization may break through a limit of an existing power battery pack through design of arrangement, size parameters, and other factors of the cell 100, to achieve greater energy density.

In Comparative example 2, Embodiment 3, and Embodiment 4, a total volume of the battery pack is 283 L. A sum of volumes of a pack body of the battery pack, an internal battery management system, and other power distribution modules is 89 L, the actual remaining volume of the battery pack that can accommodate cells and/or a cross beam and a longitudinal beam is 221 L. A length of the pack body is 1380 mm, a width is 1380 mm, and a thickness is 137 mm. A volume of a power distribution box is 11 L. The total volume of the battery pack 310 L=1580×1380×137× 0.000001+11. A width direction of the power battery pack is arranged along a width direction of a vehicle body, and a length direction of the power battery pack is arranged along a length direction of the vehicle body. A width of the vehicle body is 1950 mm.

Comparative Example 2

For the power battery pack 10' in the prior art, as shown in FIG. 1, two cross beams 500' and one longitudinal beam 600' are disposed in the pack body 200". The two cross beams 500' and one longitudinal beam 600' divide a cell into six battery modules 400', each of the battery modules 400' having a side plate and an end plate.

Embodiment 3

For the power battery pack 10 in this embodiment of this application, as shown in FIG. 15, the length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to an other side of the pack body 200 in the length direction A of the power battery pack 10. One longitudinal beam 600 and no cross beam 500 is disposed in the pack body 200, and the longitudinal beam 600 extends along the length direction A of the power battery pack 10. The plurality of cells 100 are arranged along the width direction B of the power battery pack 10 to form a battery array, and the longitudinal beam 600 divides the battery array into at least two parts along the width direction B of the power battery pack 10. A first end beam 203 and a second end beam 204 of the pack body 200 located at two ends of the power battery pack 10 in the length direction A provide supporting forces for the cells 100, and a first side beam 201 and a second side beam 202 of the pack body 200 located at two sides of the power battery pack 10 in the width direction B provide inward pressing forces for neighboring cells 100. One layer of battery array is arranged in the pack body 200 in the height direction C of the power battery pack 10. Neither an end plate nor a side plate is disposed for the battery array (or understood as a battery module) of the power battery pack 10.

Embodiment 4

For the power battery pack 10 in this embodiment of this application, as shown in FIG. 16, the length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to an other side of the pack body 200 in the length direction A of the power battery pack 10. Neither a cross beam 500 nor a longitudinal beam 600 is disposed in the pack body 200. A first end beam 203 and a second end beam 204 of the pack body 200 located at two ends of the power battery pack 10 in the length direction A provide supporting forces for the cells 100, and a first side beam 201 and a second side beam 202 of the pack body 200 located at two sides of the power battery pack 10 in the width direction B provide inward pressing forces for neighboring cells 100. One layer of battery array is arranged in the pack body 200 in the height direction C of the power battery pack 10. Neither an end plate nor a side plate is disposed for the battery array (or understood as a battery module) of the power battery pack 10.

In Comparative example 3, Embodiment 5, and Embodiment 6, a total volume of the battery pack is 414 L. A sum of volumes of a pack body of the battery pack, an internal battery management system, and other power distribution modules is 58 L, the actual remaining volume that can accommodate cells and/or a cross beam and a longitudinal beam is 356 L. A length of the pack body is 2130 mm, a width is 1380 mm, and a thickness is 137 mm. A volume of a power distribution box is 11 L. The total volume of the battery pack 414 L=2130×1380×137×0.000001+11. A width direction of the power battery pack is arranged along a width direction of a vehicle body, and a length direction of the power battery pack is arranged along a length direction of the vehicle body. A length of the vehicle body is 4700 mm.

Comparative Example 3

In this embodiment, an arrangement manner of the cells 100 in the battery pack 10 is the same as an arrangement manner in Comparative example 1.

Embodiment 5

In this embodiment, an arrangement manner of the cells 100 in the battery pack 10 is the same as an arrangement manner in Embodiment 5.

Embodiment 6

In this embodiment, a total volume of the power battery pack 10 is 508 L. A sum of volumes of a pack body 200 of the power battery pack, an internal battery management system, and other power distribution modules is 119 L, the actual remaining volume of the power battery pack 10 that can accommodate cells and/or a cross beam and a longitudinal beam is 389 L. A length of the pack body 200 is 2630 mm, a width is 1380 mm, and a thickness is 137 mm. A length of the cell is 2500 mm, a width is 118 mm, and a height is 13.5 mm. A width direction of the power battery pack is arranged along a width direction of a vehicle body, and a length direction of the power battery pack is arranged along a length direction of the vehicle body. A length of the vehicle body is 5200 mm. In this embodiment, an arrangement manner of the cells in the battery pack is the same as an arrangement manner in Embodiment 5.

Specific parameters of Embodiments 1 to 7 and Comparative examples 1 to 3 are shown in Table 1.

TABLE 1

| | Comparative example 1 | Embodiment 1 | Embodiment 2 | Comparative example 2 | Embodiment 3 | Embodiment 4 | Comparative example 3 | Embodiment 5 | Embodiment 6 |
|---|---|---|---|---|---|---|---|---|---|
| Size of cell: length, width, and height (mm) | 208*118* 13.5 | 905*118* 13.5 | 905*118* 13.5 | 208*118* 13.5 | 1280*118* 13.5 | 1280*118* 13.5 | 208*118* 13.5 | 2000*118* 13.5 | 2500*118* 13.5 |
| Quantity | 352 | 88 | 92 | 500 | 90 | 93 | 752 | 94 | 94 |
| Capacity of cell (Ah) | 47.5 | 202 | 202 | 47.5 | 286 | 286 | 47.5 | 448 | 561 |

TABLE 1-continued

| | Comparative example 1 | Embodiment 1 | Embodiment 2 | Comparative example 2 | Embodiment 3 | Embodiment 4 | Comparative example 3 | Embodiment 5 | Embodiment 6 |
|---|---|---|---|---|---|---|---|---|---|
| Quantity of electricity of cell (Wh) | 152 | 646.4 | 646.4 | 152 | 915.2 | 915.2 | 152 | 1434 | 1795 |
| Volume of cell (L) | 0.331 | 1.442 | 1.442 | 0.331 | 2.039 | 2.039 | 0.331 | 3 | 4 |
| Energy density of cell (Wh/L) | 459 | 448 | 448 | 459 | 449 | 449 | 459 | 450 | 451 |
| Size of vehicle body in extending direction of cell (mm) | 1880 | 1880 | 1880 | 1950 | 1950 | 1950 | 4700 | 4700 | 5200 |
| Quantity of electricity of battery pack (Wh) | 53504 | 56883.2 | 59468.8 | 76000 | 82368 | 85113.6 | 114304 | 134758.4 | 168748.8 |
| Total volume of battery pack (L) | 213 | 213 | 213 | 310 | 310 | 310 | 414 | 414 | 508 |
| Energy density of battery pack (Wh/L) | 251 | 268 | 280 | 245 | 266 | 275 | 276 | 326 | 332 |
| Space utilization (%) | 54.76% | 59.70% | 62.41% | 53.49% | 59.25% | 61.23% | 60.23% | 72.39% | 73.66% |
| Length of cell/size of vehicle body in extending direction of cell | 10.90% | 48.14% | 48.14% | 10.67% | 65.64% | 65.64% | 4.43% | 42.55% | 48.08% |
| Sum of lengths of cells/size of vehicle body in extending direction | 44.26% | 48.14% | 48.14% | 42.67% | 65.64% | 65.64% | 35.40% | 42.55% | 48.08% |

It may be known by a person skilled in the art by comparing the foregoing Comparative example 1 and Embodiments 1 and 2 that, compared with the power battery pack 10' in the prior art, for the power battery pack 10 according to the embodiments of this application, the space of the vehicle body in an extending direction of the cell may be fully used through design of arrangement, size parameters, and other factors of the cell 100, for example, by designing a ratio of the length of the cell to a size of the vehicle body in the width direction or a ratio of the length of the cell to a size of the vehicle body in the length direction, to achieve greater energy density.

It may be known by a person skilled in the art by comparing the foregoing Comparative example 2 and Embodiments 3 and 4 that, for the power battery pack 10 according to the embodiments of this application, greater energy density may be achieved through design of arrangement, size parameters, and other factors of the cell 100, for example, by designing a ratio of the length of the cell to a size of the vehicle body in the width direction or a ratio of the length of the cell to a size of the vehicle body in the length direction. In addition, the increase in energy density is magnified as an overall volume of the power battery pack is increased. In other words, for a power battery pack with a larger volume, energy density is more significantly improved by using the solution of the embodiments of this application.

It may be known by a person skilled in the art by comparing the foregoing Comparative example 3 and Embodiments 5 and 6 that, for the power battery pack 10 according to the embodiments of this application, the space of the vehicle body in an extending direction of the cell may be fully used through design of arrangement, size parameters, and other factors of the cell 100, for example, by designing a ratio of the length of the cell to a size of the vehicle body in the width direction or a ratio of the length of the cell to a size of the vehicle body in the length direction. This application can achieve greater energy density when the size of the vehicle body is fixed.

In the description of this specification, description of reference terms such as "a specific embodiment" or "a specific example", means including specific features, structures, materials, or features described in the embodiment or example in at least one embodiment or example of this application. In this specification, exemplary descriptions of the foregoing terms do not necessarily refer to the same embodiment or example.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

What is claimed is:

1. A cell for use in a power battery pack, the cell comprising:
   a battery body having a length L, a width H, a thickness D, and a volume V;
   wherein the length L is greater than the width H, the width H is greater than the thickness D, and the battery body meets: 400 mm≤L≤2500 mm and 0.0005 mm$^{-2}$≤L/V≤0.002 mm$^{-2}$.

2. The cell according to claim 1, wherein the length L meets: 400 mm≤L≤1500 mm.

3. The cell according to claim 1, wherein the length L meets: 1500 mm≤L≤2500 mm.

4. The cell according to claim 1, wherein the battery body further meets: L/V≤0.0015 mm$^{-2}$.

5. The cell according to claim 1, wherein a ratio of the length L to the width H meets: 4≤L/H≤21.

6. The cell according to claim 1, wherein a ratio of the length L to the width meets: 9≤L/H≤13.

7. The cell according to claim 1, wherein a ratio of the length L to the thickness D meets: 23≤L/D≤208.

8. The cell according to claim 1, wherein a ratio of the width H to the volume V meets: 0.0001 mm$^{-2}$≤H/V≤0.00015 mm$^{-2}$.

9. The cell according to claim 1, wherein a ratio of the thickness D to the volume V meets: 0.0000065 mm$^{-2}$≤D/V≤0.00002 mm$^{-2}$.

10. The cell according to claim 1, wherein the battery body has a total outer surface area S and a ratio of the length L to the total outer surface area S meets: 0.002 mm$^{-1}$≤L/S≤0.005 mm$^{-1}$.

11. The cell according to claim 1, wherein the battery body has a total outer surface area S and a ratio of the total outer surface areas S to the volume V meet: 0.1 mm$^{-1}$≤S/V≤0.35 mm$^{-1}$.

12. The cell according to claim 1, wherein the battery body has an energy E and a ratio of the length L to the energy E meets: 0.8 mm·Wh$^{-1}$≤L/E≤2.45 mm·Wh$^{-1}$.

13. The cell according to claim 1, wherein the battery body has a total outer surface area S and an energy E and a ratio of the total outer surface area S to the energy E meets: S/E≤1000 mm$^2$·Wh$^{-1}$.

14. The cell according to claim 1, wherein the battery body has an energy E and a ratio of the volume V to the energy E meets: V/E≤2000 mm$^3$·Wh$^{-1}$.

15. The cell according to claim 1, further comprising at least one explosion-proof valve; and
   wherein the battery body comprises an aluminum housing, the battery body has a first end and a second end opposite the first end in a length direction of the battery body, and the at least one explosion-proof valve disposed on at least one of the first and second ends of the battery body.

16. The cell according to claim 1, further comprising a first explosion-proof valve and a second explosion-proof valve;
   wherein the battery body comprises an aluminum housing, the battery body has a first end and a second end opposite the first end in a length direction of the battery body, the first explosion-proof valve is disposed on the first end of the battery body, the second explosion-proof valve is disposed on the second end of the battery body, and the first and second explosion proof valves are configured discharge gas to different locations.

17. A power battery pack configured to provide power to an electric vehicle, the power battery pack comprising:
   a pack body; and
   a plurality of cells disposed in the pack body;
   wherein each of the plurality of cells comprises the cell of claim 1.

18. An electric vehicle comprising:
   a vehicle body having a width W in a width direction of the vehicle body and a length X in a length direction of the vehicle body; and
   the power battery pack of claim 17;
   wherein when the power battery pack is disposed on the vehicle body, a length direction of each of the plurality of cells extends along a width direction or a length direction of the electric vehicle;
   wherein when the length direction of each cell extends along the width direction of the electric vehicle, the length L of each of the plurality of cells and the width W of the vehicle body meet: 46%≤L/W≤76%; and
   wherein when the length direction of each cell extends along the length direction of the electric vehicle, the length L of each of the plurality of cells and the length X of the vehicle body meet: 40%≤L$_0$/X≤76%.

19. The electric vehicle according to claim 18, wherein the power battery pack is disposed at a bottom of the vehicle body and the pack body is fixedly connected to a chassis of the vehicle body.

20. The electric vehicle according to claim 19, wherein a width of the power battery pack is arranged along the width W of the vehicle body, a length of the power battery pack is arranged along a length X of the vehicle body, and the length L of each of the plurality of cells is arranged along the width of the power battery pack.

* * * * *